United States Patent
Matsuda

(10) Patent No.: US 9,132,813 B2
(45) Date of Patent: Sep. 15, 2015

(54) BRAKE CONTROL SYSTEM IN VEHICLE

(75) Inventor: Yoshimoto Matsuda, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 0 days.

(21) Appl. No.: 13/478,459

(22) Filed: May 23, 2012

(65) Prior Publication Data
US 2012/0303234 A1    Nov. 29, 2012

(30) Foreign Application Priority Data

May 26, 2011    (JP) .................................. 2011-117855

(51) Int. Cl.
*B60T 8/00*    (2006.01)
*B60T 8/17*    (2006.01)

(52) U.S. Cl.
CPC ..................................... *B60T 8/1706* (2013.01)

(58) Field of Classification Search
CPC ... B60T 8/1706; B60T 8/17606; B60T 8/172; B60T 8/1703; B60T 8/17636; B60T 2210/12; B60W 10/18
USPC .................... 303/122.09, 150, 152, 191, 195; 701/70, 71, 72, 78
See application file for complete search history.

(56) References Cited

U.S. PATENT DOCUMENTS 4,790,607 A * 12/1988 Atkins ........................... 303/195
4,811,993 A    3/1989 Matsumoto et al.
4,943,922 A * 7/1990 Tanaka ............................. 701/78
6,005,358 A * 12/1999 Radev ............................ 318/139
2006/0220453 A1* 10/2006 Saito et al. ..................... 303/152
2007/0251231 A1* 11/2007 Arnold ............................ 60/545
2008/0255744 A1* 10/2008 Yasui et al. ..................... 701/70
2012/0150409 A1* 6/2012 Ogawa et al. ................... 701/71

FOREIGN PATENT DOCUMENTS

| EP | 0125659 A2 | 11/1984 |
| JP | 63101158 A | 5/1988 |
| JP | 09501126 A | 2/1997 |
| JP | 2007069870 A | 3/2007 |
| JP | 2007296908 A | 11/2007 |

(Continued)

OTHER PUBLICATIONS

WO2011/027441_Machine Translation.*

(Continued)

*Primary Examiner* — Helal A Algahaim
*Assistant Examiner* — Jelani Smith
(74) *Attorney, Agent, or Firm* — Alleman Hall McCoy Russell & Tuttle LLP

(57) ABSTRACT

A brake control system in a vehicle which executes anti-lock brake control for controlling a braking force applied to a wheel to prevent the wheel from being locked during braking of the vehicle is provided. The brake control system includes an initiation determiner section for determining whether or not an initiation condition used to initiate the anti-lock brake control is met the initiation condition including a condition in which a decrease rate of a wheel speed which is a rotational speed of the wheel is not less than a predetermined threshold; and a brake control section for initiating control of the braking force applied to the wheel in the anti-lock brake control, if the initiation determiner section determines that the initiation condition is met.

16 Claims, 10 Drawing Sheets

(56) References Cited

FOREIGN PATENT DOCUMENTS

| JP | 201151433 A | 3/2011 | |
|----|-------------|--------|---|
| WO | WO 2011027441 A1 | * | 3/2011 |

OTHER PUBLICATIONS

ISA European Patent Office, Extended European Search Report of EP12169067, Oct. 16, 2012, Germany, 5 pages.

* cited by examiner

BRAKE CONTROL SYSTEM IN VEHICLE

BACKGROUND OF THE INVENTION

1. Field of the Invention

The present invention generally relates to a brake control system which controls a braking force applied to a wheel to prevent the wheel from being locked during braking of the vehicle. More particularly, the present invention relates to a technique for initiating brake control at a proper timing.

2. Description of the Related Art

During braking of a vehicle, a gripping force of a tire with respect to a road surface is lessened due to a braking force applied to the vehicle, and rotation of the wheel almost stops. This is called a brake lock or a lock. When the wheel is locked, the vehicle becomes undirected, so that the vehicle cannot be steered effectively, or a vehicle body collapses.

To prevent the wheel from being locked, anti-lock brake control (hereinafter referred to as ABS control) is known, which controls a braking force applied to the wheel. This ABS control is as follows. If a slip ratio of the wheel or its change increases during braking and it is determined that the wheel is more likely to be locked, the ABS control is initiated. In the case of a motorcycle, it is determined whether or not to initiate the ABS control based on a slip ratio derived from a difference between a front wheel speed and a rear wheel speed. In some cases, the ABS control cannot be initiated at a proper timing, due to low calculation accuracy of the slip ratio.

During deceleration of the motorcycle, a slip ratio of the wheel (front or rear wheel) with a lower wheel speed with respect to the wheel with a higher wheel speed is derived. If the rear wheel is slightly spaced apart from a road surface in rapid deceleration, an incorrect slip ratio may be calculated.

To solve this problem, in the ABS control disclosed in Japanese Laid Open Patent Application Publication No. 2007-296908, to prevent calculation of the incorrect slip ratio due to an event in which the rear wheel is spaced apart from the road surface, the slip ratio is calculated based on a parameter other than the rear wheel speed in a predetermined state in the deceleration.

However, the above stated prior art example is effective in a particular situation in which the rear wheel is slightly spaced apart from the road surface during rapid deceleration of the motorcycle, and cannot improve overall calculation accuracy of the slip ratio during braking.

To make up for insufficient calculation accuracy of the slip ratio, it may be determined whether or not to initiate the ABS control, based on a magnitude of a braking force applied to the wheel such as a hydraulic brake pressure. However, the magnitude of the braking force indirectly indicates that the wheel is more likely to be locked, unlike the slip ratio. Therefore, it would be difficult to determine whether or not to initiate the ABS control at a proper timing, based on the magnitude of the braking force.

SUMMARY OF THE INVENTION

The present invention addresses the above described problem, and an object of the present invention is to directly detect that a wheel is more likely to be locked during braking and to determine whether or not to initiate ABS control more properly.

According to the present invention, there is provided a brake control system in a vehicle which executes anti-lock brake control for controlling a braking force applied to a wheel to prevent the wheel from being locked during braking of the vehicle, the system comprising: an initiation determiner section for determining whether or not an initiation condition used to initiate the anti-lock brake control is met, the initiation condition including a condition in which a decrease rate of a wheel speed which is a rotational speed of the wheel is not less than a predetermined threshold; and a braking force control section for initiating control of the braking force applied to the wheel in the anti-lock brake control, if the initiation determiner section determines that the initiation condition is met.

In accordance with this configuration, when the wheel speed decreases by the braking force applied to the wheel during braking of the vehicle, it is determined that the wheel is more likely to be locked and the ABS control should be initiated, if the decrease rate of the wheel speed, i.e., a magnitude (absolute value) of the wheel speed decreasing within a predetermined time, is not less than the threshold. To perform this determination, the decrease rate of the wheel speed of the wheel whose lock is to be detected is necessary and information relating to the wheel whose lock is not detected is unnecessary. Therefore, even if the information about the wheel whose lock is not detected is incorrect, this will not negatively affect the determination as to the lock of the wheel whose lock is to be detected. This makes it possible to more accurately determine the timing at which the ABS control is initiated than in the case of using a slip ratio which requires the wheel speeds of the front and rear wheels to determine the initiation of the ABS control in, for example, a motorcycle.

It is determined whether or not to initiate the ABS control based on the change of the wheel speed directly indicating that the wheel is more likely to be locked, rather than an indirect parameter such as a brake pressure of a hydraulic brake device. Therefore, the determination as to the initiation of the ABS control can be performed without being affected by how the brake device works, or an inertia of a drive system (engine and transmission), etc.

As used herein, "decrease rate of the wheel speed" means an absolute value of a decrease amount of the wheel speed within a predetermined time, the wheel speed decreasing with a passage of time during braking. For example, when the wheel speed decreases to a greater degree within a certain time period, the corresponding decrease rate is greater.

The vehicle may include an accelerator operation member operated by the driver; and the initiation determiner section does not determine whether or not the initiation condition is met, during a predetermined time period which passes after the accelerator operation member has been operated quickly to decelerate the vehicle. This enables the determination as to the initiation of the ABS control more suitably. For example, the decrease rate of the wheel speed is affected more by deceleration performed by a driving power source (including an electric motor as well as an engine), such as engine braking for a time period which passes from when the accelerator operation member has been operated quickly. Since the determination is not performed during this time period, it is possible to prevent the ABS control from being initiated incorrectly.

The vehicle may include a clutch (device for permitting or inhibiting transmission of driving power) between a drive wheel and a driving power source; and the initiation determiner section may determine whether or not the initiation condition is met within the time period which passes after the accelerator operation member has been operated quickly to decelerate the vehicle, if the clutch is disengaged. In the disengaged state of the clutch, the wheel speed is not affected by the deceleration performed by the driving power, such as engine braking, and the determination as to the initiation of the ABS control can be performed, without a delay.

The brake control system may comprise a driving state detector section for detecting a driving state of the vehicle during braking; and the initiation determiner section may change the threshold used to determine whether or not to initiate the anti-lock brake control, based on the detected driving state of the vehicle. This makes it possible to perform determination more appropriately according to a change in the driving state of the vehicle. The driving state may be a braking force, a change rate of the braking force, a slip ratio of the wheel, a vehicle speed, etc. For example, the driving state detector section may detect a value of the braking force applied to the wheel during braking of the vehicle; and the initiation determiner section may change the threshold used to determine whether or not to initiate the anti-lock brake control such that the threshold is smaller as the value of the braking force is smaller.

For example, the wheel may be locked by a relatively smaller braking force on a bad road surface such as a gravel road surface or a muddy road surface than on a good road surface such as a paved road surface. By changing the threshold used to determine whether or not to initiate the anti-lock brake control, which is set optimally for the paved road surface, to a smaller value when the magnitude of the braking force is smaller, the ABS control for the bad road surface can be initiated earlier.

The brake control system in the vehicle may comprise a braking characteristic memory for storing as a braking characteristic of the wheel, a relation between the braking force applied to the wheel and a decrease rate of the wheel speed in a range in which a gripping force of a tire is adequate such that the decrease rate increases with an increase in the braking force; and the initiation determiner section may change the threshold used to determine whether or not to initiate the anti-lock brake control based on the braking characteristic such that the threshold is smaller as the value of the braking force detected by the driving state detector section is smaller.

The braking characteristic can be researched for each wheel from an experiment or the like using an actual vehicle. Based on the braking characteristic, the threshold used to determine whether or not to initiate the ABS control is changed, thereby allowing the ABS control to be initiated at a more proper timing. For example, a rate of a decrease in the wheel speed which is caused by the braking force applied to the wheel on the good road surface such as the paved road surface may be researched as the standard decrease rate of the wheel speed and stored as corresponding to the braking force.

In this state, the initiation determiner section may identify the standard value of the decrease rate of the wheel speed based on the value of the braking force detected by the driving state detector section, with reference to the braking characteristic; and the initiation determiner section may change the threshold used to determine whether or not to initiate the anti-lock brake control such that the threshold is smaller as a difference between the standard value and the decrease rate is greater if the decrease rate is greater than the standard value.

If the value of the decrease rate is farther from the standard decrease rate, i.e., a deviation from the standard decrease rate is greater and the wheel is more likely to be locked, when the rate of the decrease of the wheel speed which is attributed to the braking force exceeds the standard decrease rate during braking, the threshold is changed into a smaller value. This allows the determination as to the initiation of the ABS control to be performed earlier, i.e., at a more proper timing.

The initiation determiner section may change the threshold used to determine whether or not to initiate the anti-lock brake control such that the threshold is smaller as a change rate of the braking force detected by the driving state detector section is greater. This allows the ABS control to be initiated earlier, i.e., at a proper timing, when a rapid brake operation occurs and the wheel is more likely to be locked.

The initiation condition may include a first condition based on the decrease rate of the wheel speed and a second condition based on a parameter other than the decrease rate of the wheel speed. The second condition may be associated with a general slip ratio. Since the first condition and the second condition are set independently, it is possible to prevent these conditions from interfering with each other. As a result, the ABS control is executed stably.

It may be determined that the condition used to initiate the ABS control is met if both of the first and second conditions are met. This can suppress the ABS control from being initiated excessively. Or, it may be determined that the condition used to initiate the ABS control is met if one of the first and second conditions is met. This allows the ABS control to be initiated earlier and more surely.

The first and second conditions may be set separately. In this case, there may be provided an integrated control section for determining whether or not to initiate the ABS control based on determination results based on the two conditions.

The initiation control section and the brake control section may be included in a single ECU or separate ECUs. This makes it possible to optimize the control relating to the initiation of the ABS control according to a vehicle type and perform the ABS control in the same manner after it is initiated. As a result, the ABS control can be executed appropriately for each vehicle type without increasing development cost. The ECU can be implemented by utilizing a general system.

The vehicle may include a setting operation member operated by the driver to set the initiation condition of the anti-lock brake control; and the initiation determiner section may change the threshold used to determine whether or not to initiate the anti-lock brake control, according to the driver's operation of the setting operation member. In this way, the timing at which the ABS control is initiated can be changed depending on various cases where a higher fuel efficiency is required, a higher driving power is required, the vehicle is traveling on a town, the vehicle is traveling on a circuit, the driver alone is riding in the vehicle, a passenger is riding in the vehicle in addition to the driver, etc.

The above and further objects, features and advantages of the invention will more fully be apparent from the following detailed description with reference to the accompanying drawings.

BRIEF DESCRIPTION OF THE DRAWINGS

FIGS. 7A and 7B are views corresponding to FIG. 5, each schematically showing a change in a decrease rate of a wheel speed during braking and determination as to whether or not to initiate the ABS control, wherein FIG. 7A shows a case where a road surface has a good condition, and FIG. 7B shows a case where the road surface has a bad condition.

DETAILED DESCRIPTION OF THE PREFERRED EMBODIMENTS

Now, embodiments of a motorcycle according to an embodiment of the present invention will be described with reference to the drawings. Throughout the drawings, the same or corresponding components are designated by the same reference symbols. The stated directions are referenced from the perspective of a driver riding in the motorcycle.

Embodiment 1

Figure 1:
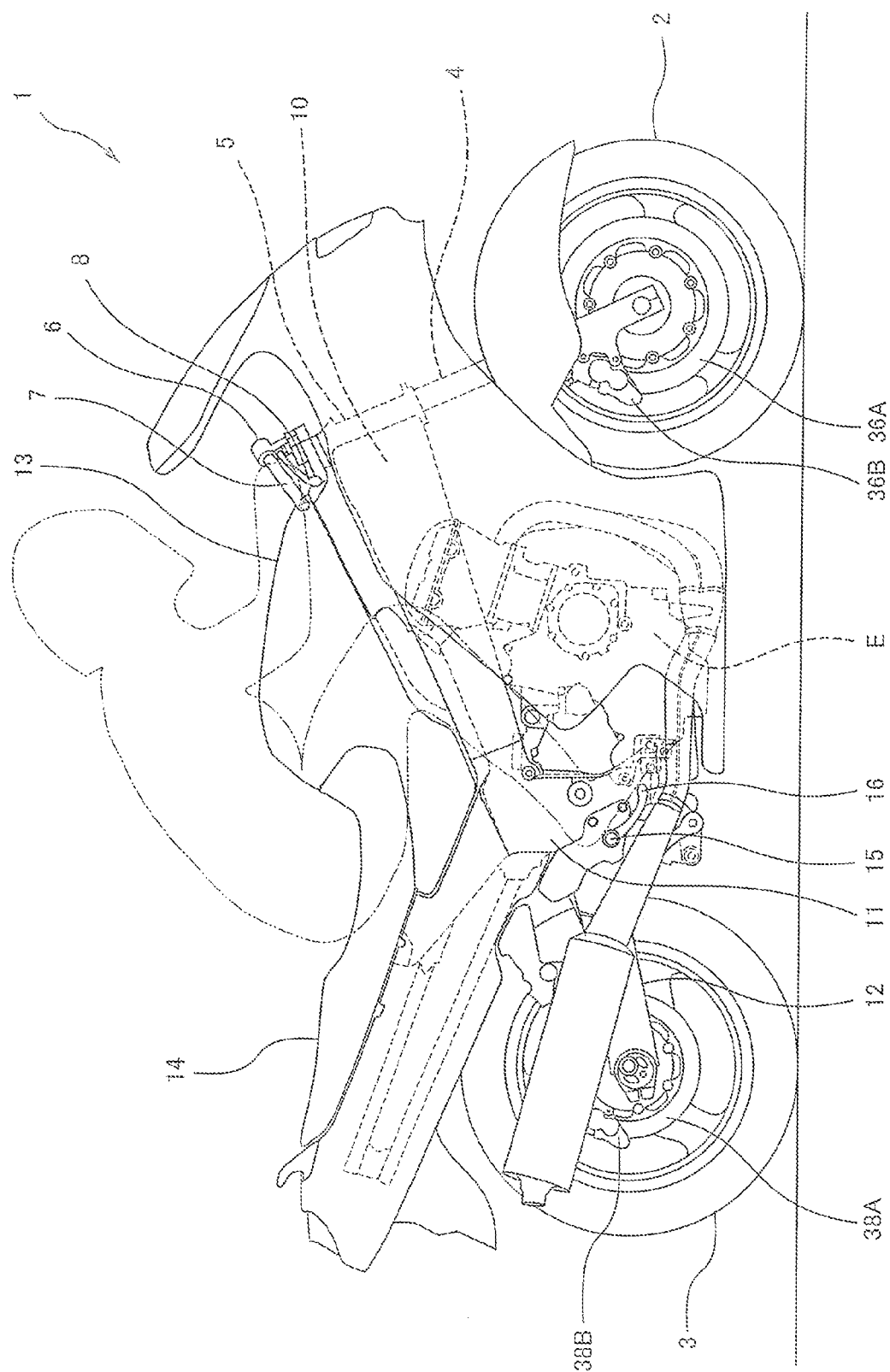
FIG. 1 is a right side view of a motorcycle according to an embodiment of the present invention.

FIG. 1 is a right side view of a motorcycle 1 according to the embodiment of the present invention. As shown in FIG. 1, the motorcycle 1 includes a front wheel 2 which is a driven wheel and a rear wheel 3 which is a drive wheel. The front wheel 2 is rotatably mounted to a lower end portion of a front fork 4 extending substantially vertically. The front fork 4 is mounted to a steering shaft (not shown) via a pair of upper and lower brackets (not shown). The steering shaft is rotatably supported by a head pipe 5 provided on a vehicle body.

A bar-type steering handle 6 extending in a rightward and leftward direction is attached to the upper bracket coupled to an upper end of the front fork 4. The driver steers the steering handle 6 to steer the front fork 4 and the front wheel 2. A front wheel brake caliper 36B is mounted to a lower end portion of the front fork 4 such that the brake caliper 36B seizes a front wheel brake disc 36A rotatable together with the front wheel 2. The front wheel brake caliper 36B and the front wheel brake disc 36A constitute a front wheel brake 36 (see FIG. 2). The front wheel brake caliper 36B includes a piston (not shown) pressed against the front wheel brake disc 36A by a hydraulic pressure (fluid pressure).

A throttle grip 7 (accelerator operation member) which can be gripped by the driver's right hand is provided at a right end of the steering handle 6. The driver rotates the throttle grip 7 by twisting the driver's wrist to actuate a throttle device 17 (see FIG. 2) as described later. A brake lever 8 is provided forward relative to the throttle grip 7 to actuate the front wheel brake 36. A clutch lever 9 (see FIG. 2) is attached to a left end of the steering handle 6 in a location forward relative to a grip which can be gripped by the driver's left hand, to actuate a clutch 27 (see FIG. 2) as describe later.

A pair of right and left main frames 10 extends rearward from the head pipe 5 such that the main frames 10 are tilted slightly in a downward direction. Pivot frames 11 are coupled to rear portions of the main frames 10, respectively. Swing arms 12 extending in a substantially forward and rearward direction are coupled at front end portions thereof to the pivot frames 11, respectively such that the swing arms 12 are pivotable around the front end portions. The rear wheel 3 is rotatably mounted to rear end portions of the swing arms 12.

A rear wheel brake caliper 38B is mounted to rear end portions of the swing arms 12 such that the rear wheel brake caliper 38B seizes a rear wheel brake disc 38A. The rear wheel brake caliper 38B and the rear wheel brake disc 38A constitute a rear wheel brake 38 (see FIG. 2).

A fuel tank 13 is positioned on upper portions of the main frames 10 in a range from a region near the steering handle 6 to a rearward region. A seat 14 which can be straddled by the driver is positioned behind the fuel tank 13. Below the seat 14, steps 15 are provided at right and left sides to allow the driver's feet to rest thereon. A brake pedal 16 extends forward from an underside portion of the right step 15. A rear end portion of the brake pedal 16 is coupled to a step stay, or the like such that the brake pedal 16 is pivotable. The driver depresses (presses down) the brake pedal 16 to primarily actuate the rear wheel brake 38.

An engine E is positioned below the main frames 10 and mounted to the main frames 10 and the pivot frames 11. For example, the engine E is an inline four-cylinder engine. The throttle device 17 (see FIG. 2) is coupled to a rear side of the engine E. A driving power of the engine E is transmitted from a transmission 18 (see FIG. 2) attached integrally with a crankcase to the rear wheel 3 via a driving power transmission member such as a chain.

—Configuration of Overall Control System—

Figure 2:
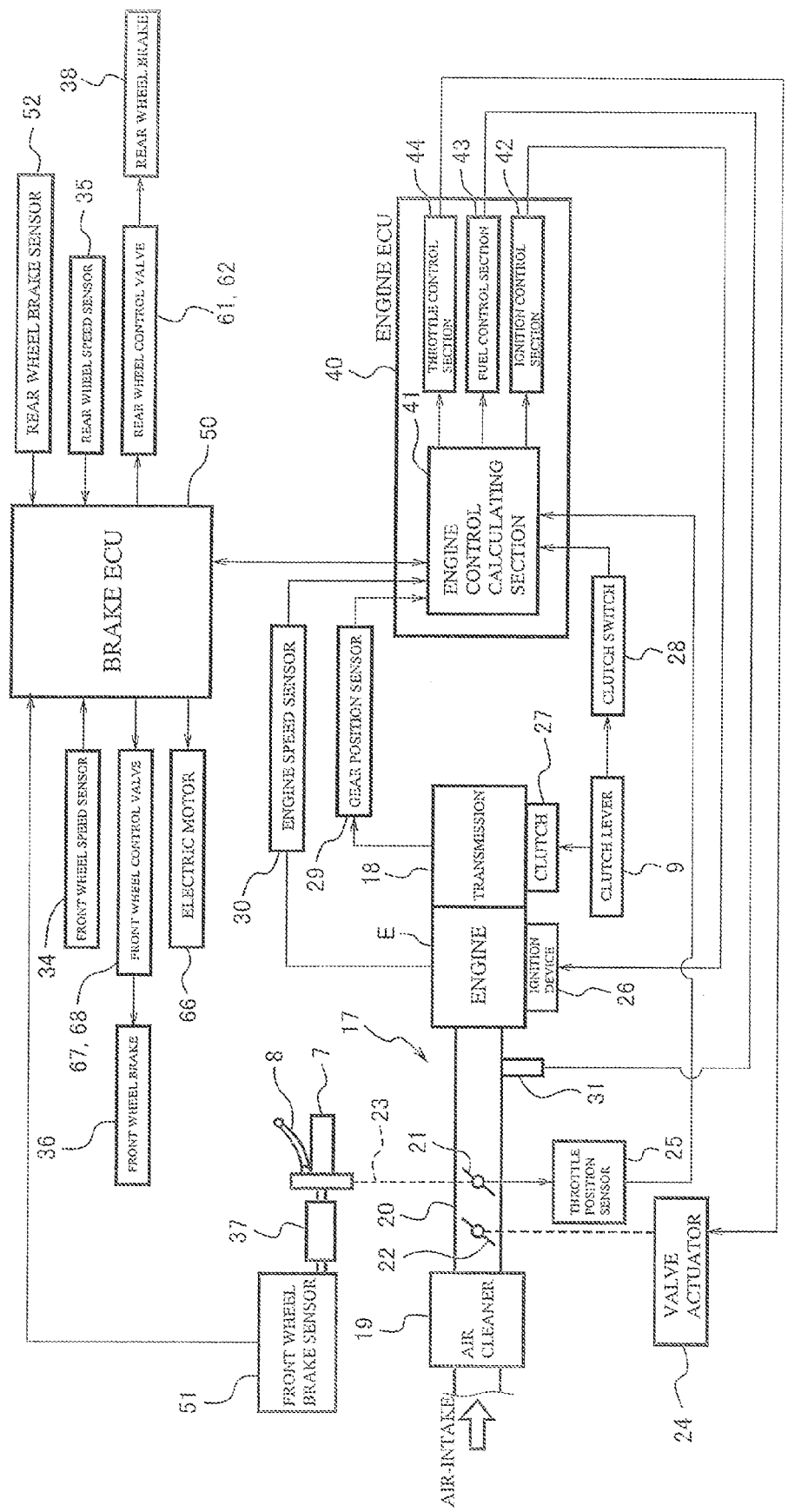
FIG. 2 is a block diagram showing a configuration of an overall control system in the motorcycle.

FIG. 2 is a block diagram showing a configuration of the overall control system incorporated into the motorcycle 1 of FIG. 1. Turning now to FIG. 2, the throttle device 17 is positioned downstream of an air cleaner 19 in an air flow direction in an air-intake passage 20 of the engine E. The throttle device 17 includes a main throttle valve 21 and a sub-throttle valve 22 positioned upstream of the main throttle valve 21 in the air flow direction. The main throttle valve 21 is coupled to the throttle grip 7 via a throttle wire 23. The main throttle valve 21 is opened and closed in response to the driver's operation of the throttle grip 7.

A throttle position sensor 25 is attached on the throttle device 17 to detect an opening degree of the main throttle valve 21. By detecting the opening degree of the main throttle valve 21, a displacement amount (displacement amount of the accelerator operation member operated by the driver) of the throttle grip 7 coupled mechanically to the main throttle valve 21 is detected.

The sub-throttle valve 22 is coupled to a valve actuator 24 constituted by, for example, an electric motor. The valve actuator 24 is actuated in response to a signal from an ECU 40 to continuously change a cross-sectional area (throttle valve opening degree) of the air-intake passage 20. The throttle valve 17 is provided with a plurality of injectors 31 which respectively inject a fuel to a plurality of branch passages provided to respectively correspond to the plurality of cylinders of the engine E. The fuel injected from each of these injectors 31 is mixed with air in a corresponding one of the cylinders of the engine E, to form an air-fuel mixture. Ignition devices 26 each including an ignition plug and an ignition circuit are provided to respectively correspond to the cylinders, to ignite the air-fuel mixture.

The transmission 18 is attached integrally with the engine E as described above and provided with the clutch 27. The clutch 27 is engaged to permit the driving power from the crankshaft to be transmitted or disengaged to inhibit the driving power from being transmitted to the rear wheel 3. The clutch lever 9 is mechanically coupled to the clutch 27 via a wire or the like. When the driver grips the clutch lever 9, the clutch 27 is disengaged to inhibit the driving power from being transmitted to the rear wheel 3, while when the driver releases the clutch lever 9, the clutch 27 is engaged to permit the driving power to be transmitted. The clutch lever 9 is attached with a clutch switch 28 configured to detect whether or not the clutch lever 9 has been gripped.

Although not shown, the transmission 18 includes an input shaft and an output shaft which extend in parallel. A gear train of the input shaft and a gear train of the output shaft are configured to mesh with each other. In the disengaged state of the clutch 27, a combination of a gear of the input shaft and a gear of the output shaft is changed to change a transmission gear position. The transmission 18 is attached with a gear position sensor 29 for detecting the transmission gear position. The engine E is attached with an engine speed sensor 30 for detecting a rotational speed (engine speed) of the crankshaft.

The throttle position sensor 25, the clutch switch 28, the gear position sensor 29, the engine speed sensor 30, and other components are coupled to the engine ECU 40. The engine ECU 40 includes a processor unit such as a microcomputer, memory, and other logic components. The engine ECU 40 includes an engine control calculating section 41 for calculating an air-intake amount, a fuel injection amount, an ignition timing, etc., to control the operation of the engine E based on signals received as inputs from the sensors 25, 29, and 30, and the clutch switch 28. The engine ECU 40 includes an ignition control section 42 for controlling the ignition devices 26 based on a result of a calculation, a fuel control section 43 for controlling the injectors 31 based on a result of a calculation, and a throttle control section 44 for controlling the valve actuator 24 of the sub-throttle valve 22 based on a result of a calculation.

—Brake Control System—

The motorcycle 1 of the present embodiment includes a brake control system which operates as a known anti-lock brake system (ABS). A brake ECU 50 including a processor unit such as a microcomputer, memory, and other logic components, is coupled with a front wheel hydraulic brake pressure sensor (hereinafter referred to as front wheel brake pressure sensor) 51 for detecting a front wheel brake pressure generated by operation of the brake lever 8, a rear wheel hydraulic brake pressure sensor (hereinafter referred to as rear wheel brake pressure sensor) 52 for detecting a rear wheel brake pressure generated by depression of the brake pedal 16, a front wheel speed sensor 34 for detecting a wheel speed (front wheel vehicle speed) from a rotational speed of the front wheel 2, and a rear wheel speed sensor 35 for detecting a wheel speed (rear wheel vehicle speed) from a rotational speed of the rear wheel 3. The wheel speed is derived by multiplying a rotational angle speed of the wheel by a peripheral length of the wheel.

The brake ECU 50 is coupled with the engine ECU 40 to allow signal transmission and reception between them, control valves 61, 62, 67 and 68 and an electric motor 66 of hydraulic pumps 63 and 69 in a hydraulic brake pressure system 60 as will be described later. If it is determined that the wheel is more likely to be locked and a condition used to initiate the ABS control is met, based on the signals from the sensors 34, 35, 51, and 52 and the engine ECU 40, the brake ECU 50 controls the hydraulic brake pressure system 60 to increase or decrease a brake pressure of the brake 36 of the front wheel 2 and a brake pressure of the brake 38 of the rear wheel 3, to control a braking force applied to the front wheel 2 and a braking force applied to the rear wheel 3, respectively.

Figure 3:
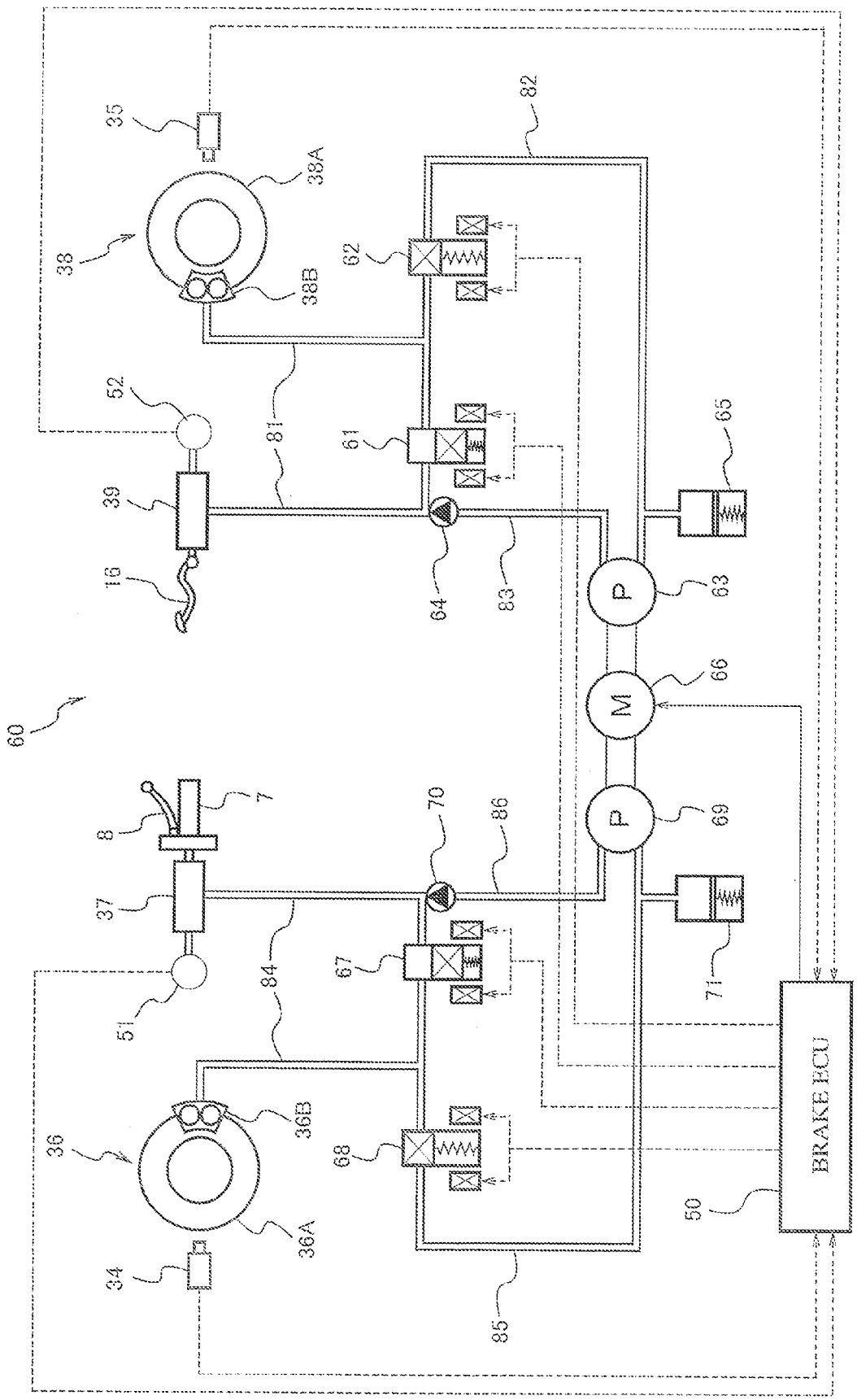
FIG. 3 is a view of a hydraulic system of a brake control system incorporated into the motorcycle.

FIG. 3 is a view of the hydraulic brake pressure system 60 of the present embodiment. At the left side of FIG. 3, a front wheel hydraulic brake pressure system is shown, in which a hydraulic brake pressure is fed to the caliper 36B of the front wheel brake 36 by the driver's operation of the brake lever 8 to apply a braking force to the front wheel 2. Likewise, at the right side of FIG. 3, a rear wheel hydraulic brake pressure system is shown, in which the brake pressure is fed to the caliper 38B of the rear wheel brake 38 by the driver's depressing operation of the brake pedal 16 to apply the braking force to the rear wheel 3. The front wheel hydraulic brake pressure system is fundamentally identical in configuration to the rear wheel hydraulic brake pressure system, and therefore, the rear wheel hydraulic brake pressure system will be described hereinafter.

In the rear wheel hydraulic brake pressure system, the brake pedal 16 is coupled to a rear wheel brake master cylinder 39. According to a displacement amount of the brake pedal 16 which is depressed by the driver, the rear wheel brake master cylinder 39 generates a brake pressure (master pressure). This brake pressure is fed to a piston of the rear wheel brake caliper 38B via a rear wheel main passage 81. The rear wheel first control valve 61 is provided in the rear wheel main passage 81. The rear wheel first control valve 61 is opened and closed in response to a command signal from the brake ECU 50, to provide communication or discommunication of the rear wheel main passage 81.

A rear wheel pressure decrease passage 82 branches from a location of the rear wheel main passage 81, between the rear wheel first control valve 61 and the rear wheel brake caliper 38B. A downstream end of the rear wheel pressure decrease passage 82 is coupled to a suction side of the rear wheel hydraulic pump 63, and the rear wheel second control valve 62 and the rear wheel reservoir 65 are provided on the rear wheel pressure decrease passage 82. The rear wheel second control valve 62 is opened and closed in response to a command signal from the brake ECU 50, to provide communication or discommunication of the rear wheel pressure decrease passage 82.

For example, the rear wheel first control valve 61 is an electromagnetic valve which is open in a normal state and has two-ports corresponding to two-positions, while the rear wheel second control valve 62 is an electromagnetic valve which is closed in a normal state and has two-ports corresponding to two-positions. According to the driver's depressing operation of the brake pedal 16, the brake pressure (master pressure) generated in the rear wheel brake master cylinder 39 is fed to the rear wheel brake caliper 38B via the rear wheel first control valve 61 in an open position. In this way, a braking force corresponding to the driver's depressing operation of the brake pedal 16 is applied to the rear wheel 3.

The rear wheel first control valve 61 and the rear wheel second control valve 62 are duty-controlled in accordance with the command signals from the brake ECU 50 so that the brake pressure (caliper pressure) of the rear wheel brake caliper 38B is maintained or decreased. As a result, the braking force applied to the rear wheel 3 is adjusted. If the rear wheel first control valve 61 is closed in a state where the rear wheel second control valve 62 is closed, the caliper pressure of the rear wheel brake 38 can be maintained. If the rear wheel second control valve 62 is opened to provide communication between the rear wheel brake caliper 38B and the rear wheel reservoir 65, the caliper pressure can be decreased.

A rear wheel pressure increase passage 83 is coupled to an outlet of the rear wheel hydraulic pump 63. A downstream end of the rear wheel pressure increase passage 83 is coupled to the rear wheel main passage 81 in a location between the rear wheel brake master cylinder 39 and the rear wheel first control valve 61. A rear wheel one-way valve 64 is provided on the rear wheel pressure increase passage 83. When the electric motor 66 is actuated in response to the command signal from the brake ECU 50, the rear wheel hydraulic pump 63 is actuated to increase the brake pressure in the rear wheel pressure increase passage 83. Thereby, the caliper pressure of the rear wheel brake 38 can be increased.

Like the rear wheel hydraulic brake pressure system, the front wheel hydraulic brake pressure system depicted at the left side of FIG. 2, includes a front wheel brake master cylinder 37 for generating a brake pressure (master pressure) according to the driver's operation of the brake lever 8, a front wheel main passage 84 for feeding the brake pressure to the front wheel brake caliper 36B, a front wheel pressure decrease passage 85 which branches from a location of the front wheel main passage 84 and extends to a suction side of a front wheel hydraulic pump 69, and a front wheel pressure increase hydraulic passage 86 coupling an outlet of the front wheel hydraulic pump 69 to the front wheel main passage 83.

The front wheel first control valve 67, the front wheel second control valve 68 and the front wheel one-way valve 70 are provided on the front wheel main passage 84, the front wheel pressure decrease passage 85, and the front wheel pressure increase passage 86, respectively. In response to the command signal from the ECU 50, the front wheel hydraulic pump 69 is actuated, and the front wheel first control valve 67 and the front wheel second control valve 68 are duty-controlled. Thereby, the brake pressure (caliper pressure) of the front wheel brake caliper 36B is maintained, reduced or increased, thereby adjusting a braking force applied to the front wheel 2. A front wheel reservoir 71 is coupled to the front wheel pressure decrease passage 85 between the front wheel second control valve 68 and the front wheel hydraulic pump 69.

—ABS Control—

Figure 4:
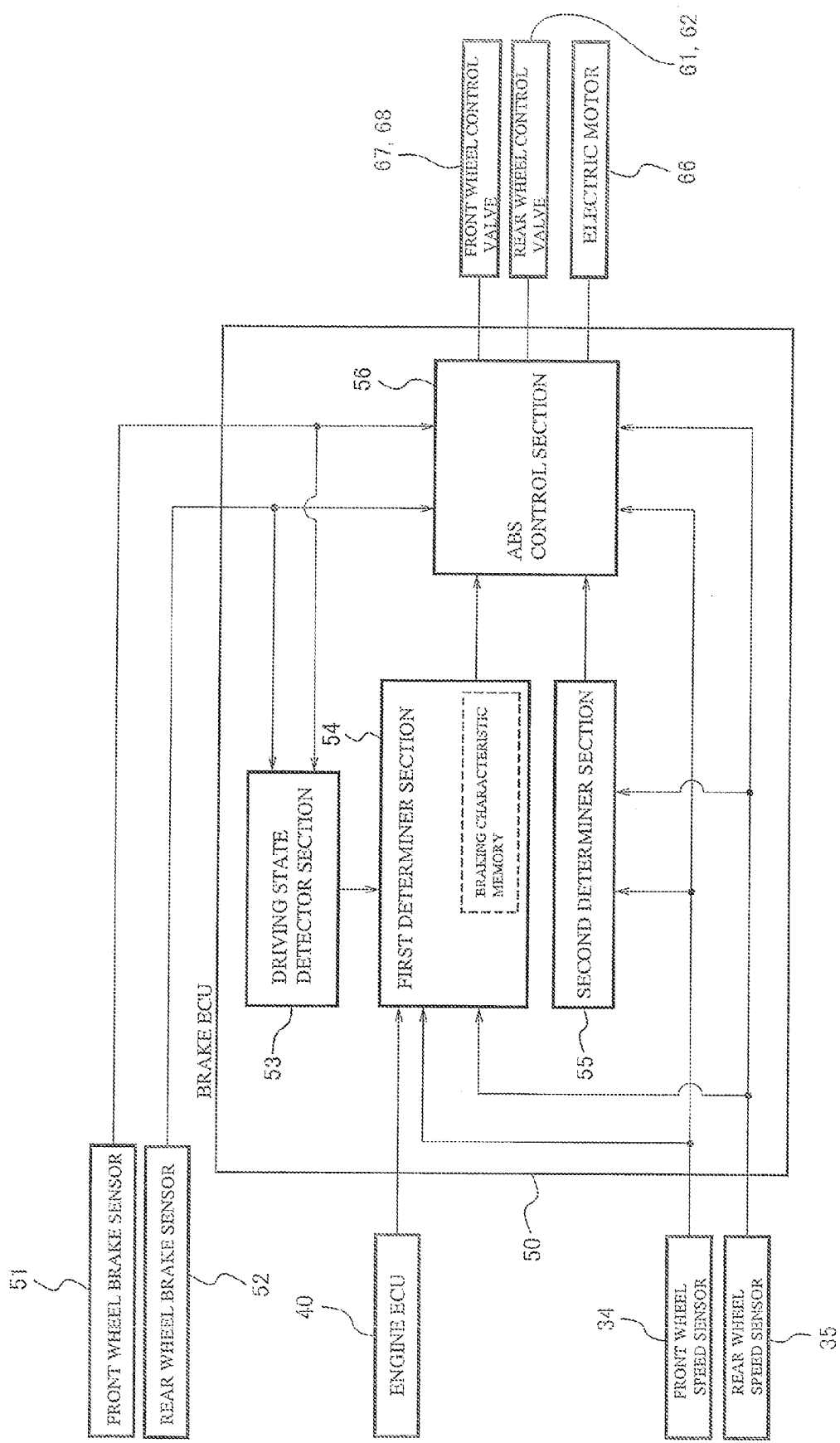
FIG. 4 is a block diagram showing major components in the brake control system of Embodiment 1.

FIG. 4 is a block diagram showing major components in the brake control system of Embodiment 1. For example, the brake ECU 50 includes a driving state detector section 53 which receives as inputs the signal from the brake pressure sensor 51 of the front wheel 2 and the signal from the brake pressure sensor 52 of the rear wheel 3 and detects brake pressures as state amounts indicating a driving state of the motorcycle 1 during braking, and a first determiner section 54 which receives the signal from the wheel speed sensor 34 of the front wheel 2 and the signal from the wheel speed sensor 35 of the rear wheel 3 and determines that a first condition used to initiate the ABS control is met if a decrease rate of the wheel speed of each of the front wheel 2 and the rear wheel 3 increases to a value which is not less than a predetermined threshold.

As used herein, the decrease rate of the wheel speed refers to a decrease amount (absolute value) of the wheel speed within a predetermined time in deceleration. In the present embodiment, as the decrease rate of the wheel speed, a difference in the wheel speed, to be precise, a difference $\Delta$ Vf in the front wheel speed Vf and a difference $\Delta$ Vr in the rear wheel speed Vr are used. The difference $\Delta$ Vf in the front wheel speed Vf may be a difference between two values which are adjacent in time (difference obtained by subtracting a subsequent value from a previous value), among the values detected by the front wheel speed sensor 34 at predetermined sampling periods. The difference $\Delta$ Vr in the rear wheel speed Vr may be a difference between two values which are adjacent in time (difference obtained by subtracting a subsequent value from a previous value), among the values detected by the rear wheel speed sensor 35 at predetermined sampling periods. Or, the difference $\Delta$ Vf in the front wheel speed Vf and the difference $\Delta$ Vr in the rear wheel speed Vr may be each derived by using two values which are not adjacent in time.

Or, the difference $\Delta$ Vf in the front wheel speed Vf and the difference $\Delta$ Vr in the rear wheel speed Vr may be derived by a moving average.

The brake ECU 50 further includes a second determiner section 55 which determines that a second condition used to initiate the ABS control for the wheel which is lower in vehicle speed is met, if a difference |Vf−Vr| between the front wheel speed Vf and the rear wheel speed Vr increases to a value which is not less than a predetermined threshold in deceleration, and an ABS control section 56 for executing the ABS control in such a manner that the control valves 61, 62, 67 and 68 and the hydraulic pumps 63 and 69 in the hydraulic brake pressure system 60 are actuated as described above. The determination condition corresponding to the second determiner section 55 may be different from the determination condition corresponding to the first determiner section 54, which relates to the wheel speed of one of the front wheel 2 and the rear wheel 3, and may be existing determination condition.

Note that the difference |Vf−Vr| between the front wheel speed Vf and the rear wheel speed Vr is an absolute value. Assuming that one of the front wheel 2 and the rear wheel 3 is not slipping at all (its slip ratio is zero), the difference |Vf−Vr| is a value corresponding to a slip ratio of the other. For example, in a case where the rear wheel speed Vr is lower than the front wheel speed Vf during braking, a value (|Vf−Vr|/Vr) which is derived by dividing by the rear wheel speed Vr, an absolute value of a deviation |Vf−Vr| of the rear wheel speed Vr from the front wheel speed Vf may be assumed as the slip ratio of the rear wheel 3.

Furthermore, in the present embodiment, the first determiner section 54 receives as inputs the signals from the throttle position sensor 25 and the clutch switch 28 via the engine ECU 40 and determines whether or not to initiate the ABS control based on an operated state of the throttle grip 7 and an operated state of the clutch lever 9. In addition, the first determiner section 54 changes a threshold used to determine whether or not to initiate the ABS control based on a magnitude of a brake pressure detected by the driving state detector section 53. These will be described in detail later.

—Method of Initiating ABS Control—

Figure 5:
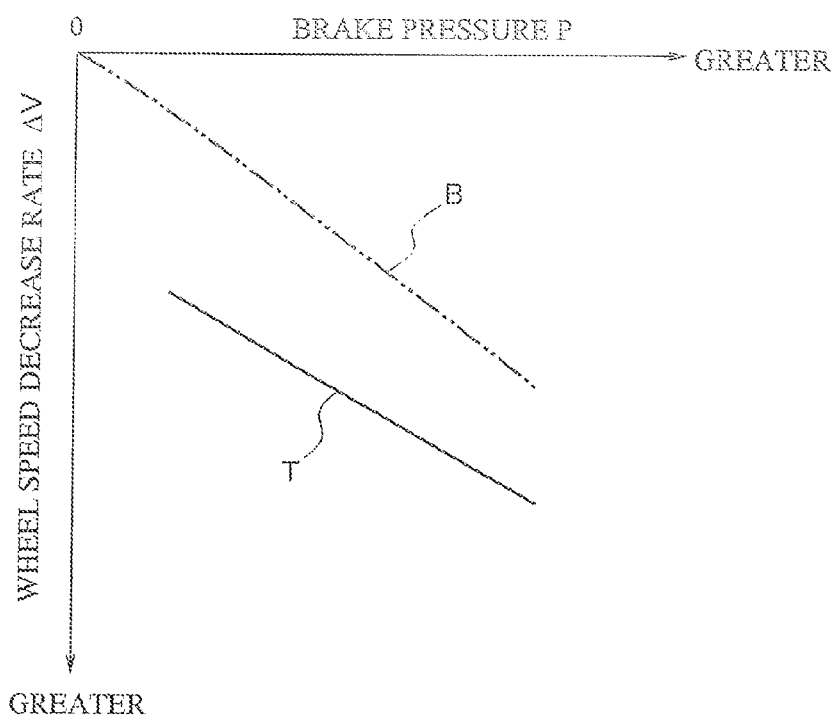
FIG. 5 is a view showing an exemplary table defining a braking characteristic line and a threshold line of ABS control in the motorcycle.
Figure 6:
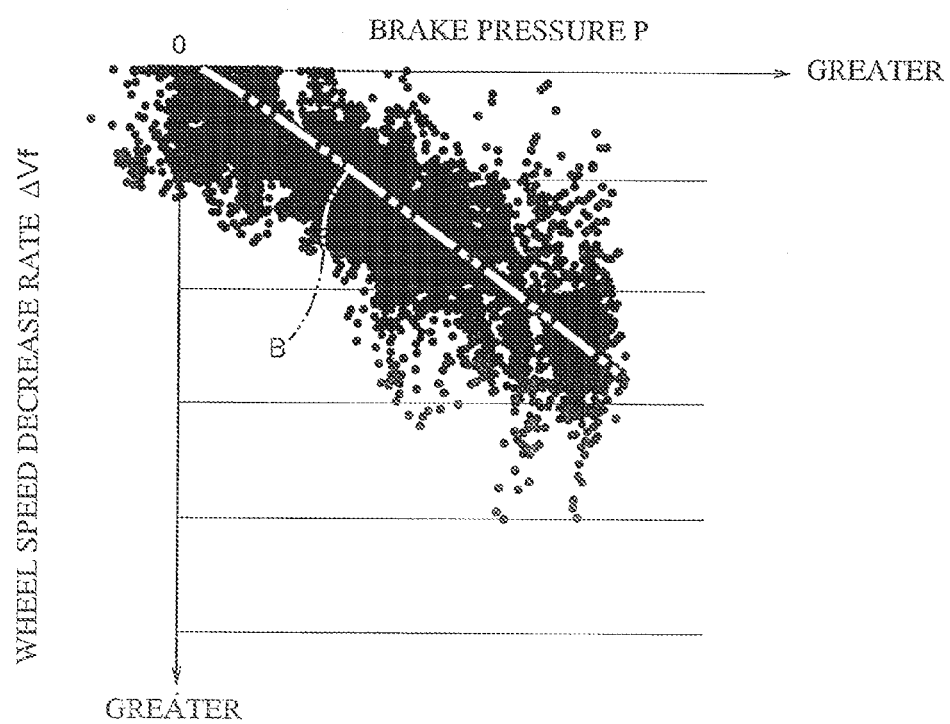
FIG. 6 is a graph of data indicating a braking characteristic of the motorcycle.
Figure 7A:
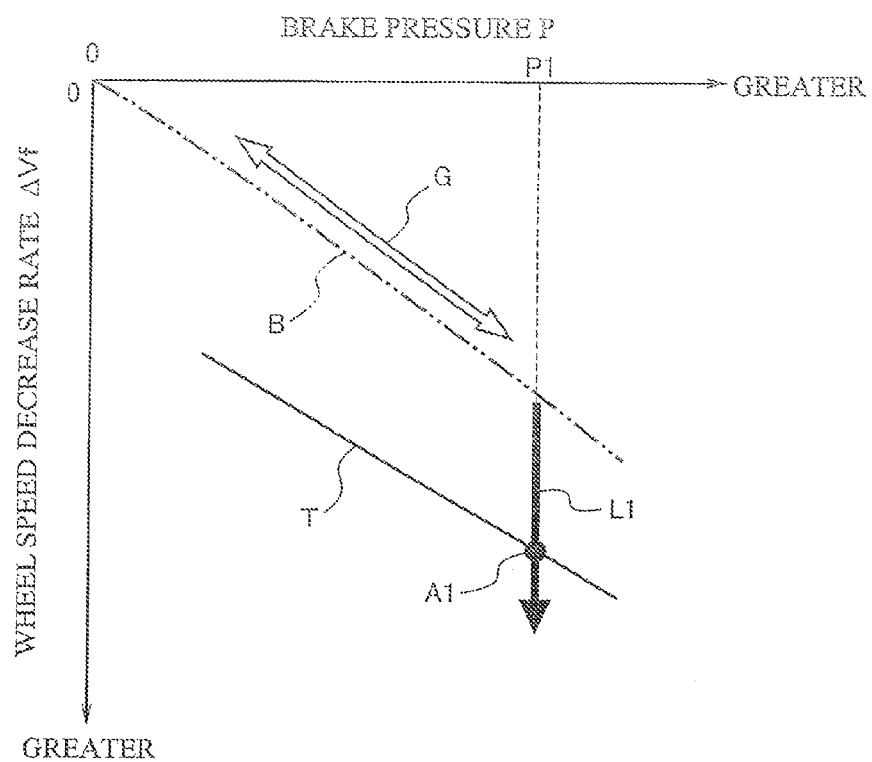
Figure 7B:
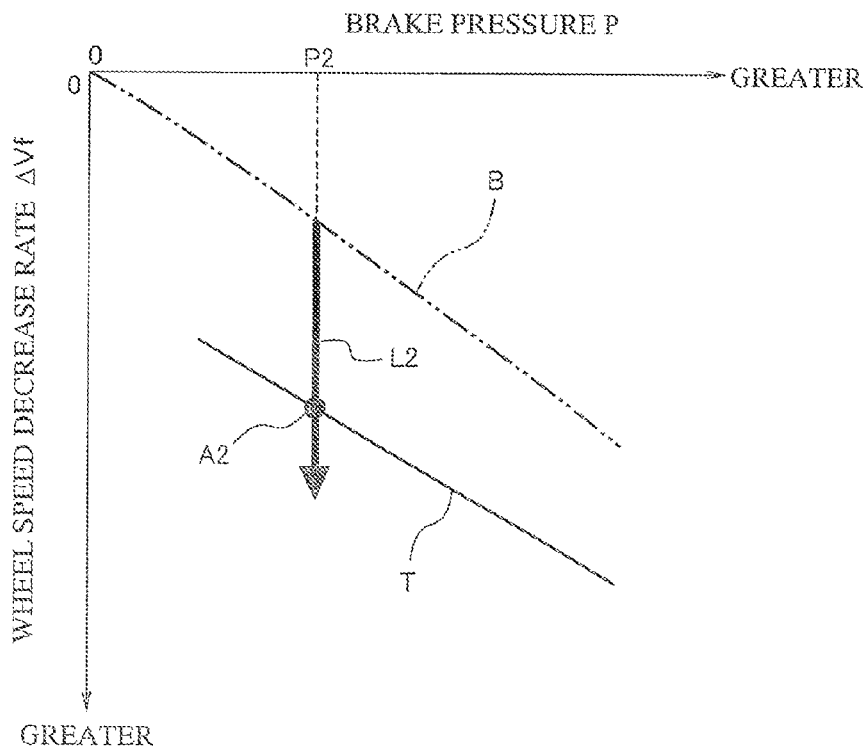

Hereinafter, a method of determining whether or not to initiate the ABS control in the first determiner section 54 will be described with reference to FIG. 5 to FIGS. 7A and 7B. FIG. 5 shows an exemplary table in which a braking characteristic line and a threshold line are set based on an exemplary data of a braking characteristic. FIG. 6 shows the exemplary data of the braking characteristic of the motorcycle 1. FIGS. 7A and 7B are views schematically showing a change in a wheel speed decrease rate during braking, and determination as to whether or not to initiate the ABS control based on the change in the wheel speed decrease rate.

In a portion (braking characteristic memory 54*a*) of the memory area of the brake ECU 50, the table containing the braking characteristic of FIG. 5 corresponding to each of the front wheel 2 and the rear wheel 3 is electronically stored. In the table, a horizontal axis indicates a caliper pressure of the front wheel brake 36 or the rear wheel brake 38. This caliper pressure is equal to a master pressure before the ABS control is initiated, and therefore is expressed as a hydraulic brake pressure (hereinafter referred to as a brake pressure) P. In the table, a vertical axis indicates a decrease rate $\Delta$V of the wheel speed V of the front wheel 2 or the rear wheel 3. In a downward direction, the decrease rate $\Delta$V is greater, for easier explanation.

In FIG. 5, a curve B indicated by a two-dotted line is the braking characteristic line, which defines a relation between a magnitude of the brake pressure P applied to the wheel 2, 3 and the decrease rate ΔV of the wheel speed V, when the wheel speed V decreases according to an increase in the braking force applied to the wheel in a state where a gripping force of a tire is adequate. The braking characteristic line B indicates the braking characteristic unique to the motorcycle 1 and the wheel 2, 3. For example, the braking characteristic line B defines a standard value (standard decrease rate) of the decrease rate ΔV of the wheel speed generated in the wheel 2, 3, which is attributed to the brake pressure P during braking of the motorcycle 1 on a standard paved road surface.

To be more specific, the relation between the brake pressure P applied to the front wheel 2 of the motorcycle 1 and the decrease rate ΔVf of the front wheel speed Vf is researched through a test conducted using an actual motorcycle. FIG. 6 is a graph showing plotted values of the brake pressure P applied to the front wheel 2 and the decrease rate ΔVf of the front wheel speed Vf of the front wheel 2 in a case where the driver actuates the brakes of the front and rear wheels 2 and 3 on the standard paved road surface. This graph shows that the decrease rate ΔVf of the front wheel speed Vf increases as the brake pressure P increases. There is a variation in the decrease rates ΔVf even though the brake pressure P is equal, because of a difference in a speed of the driver's braking operation between the front and rear wheels 2 and 3, a road surface condition, a difference in ground load between the front and rear wheels 2 and 3.

With reference to FIG. 6, when the brake pressure P is smaller than a predetermined value, a clearance or slide between the brake disc 38A and the brake caliper 38B is great, which degrades the relation with the braking force applied to the rear wheel 3. Therefore, such data are excluded and proper polynomial approximation is performed. This results in the braking characteristic line B in which the decrease rate ΔVf of the front wheel speed Vf increases as the brake pressure P increases, as indicated by the two-dotted line. In a range from a region near the braking characteristic line B to a region above the braking characteristic line B (the region in which the decrease rate ΔVf of the front wheel speed Vf is relatively smaller), a gripping force of the tire of the front wheel 2 is adequate. Therefore, in this range, there is no fear that the front wheel 2 is locked. On the other hand, in a lower range below the braking characteristic line B, the decrease rate ΔVf of the front wheel speed Vf is greater, and there is a high tendency that the front wheel 2 is locked.

In a general rubber tire characteristic, a gripping force of the tire is greatest when there is a little slip between the tire and the road surface. As known, when the slip increases in an accelerated manner from this state, the tire will be locked. As a solution to this, a threshold line T is set below the braking characteristic line B to determine whether or not to initiate the ABS control, as indicated by a solid line T in FIG. 5. Like the braking characteristic line B, the threshold line T is a curve in which the decrease rate ΔV increases as the brake pressure P increases. It is presumed that in a range below the threshold line T, the front wheel 2 is locked.

If a spacing between the braking characteristic line B and the threshold line T is set too small, the decrease rate ΔV will exceed the threshold, when the driver performs a quick brake operation on a road surface which is high in friction coefficient. In this case, the ABS control will be initiated incorrectly. To avert this, the threshold is set as small as possible (closer to the braking characteristic line B in FIG. 5) such that the quick brake operation can be distinguished.

Since the threshold line T is set such that the decrease rate ΔV increases as the brake pressure P increases, like the braking characteristic line B, the decrease rate ΔV which is the threshold used to determine whether or not to initiate the ABS control is smaller (upper value in FIG. 5) as the magnitude of the brake pressure P is smaller. Therefore, if the wheel is going to be locked irrespective of a relatively small brake pressure P, when the motorcycle 1 is traveling on a bad road surface which has a low friction coefficient between the tire and the road surface, such as a gravel road or a muddy road, i.e., low-pt-road, the ABS control is initiated earlier in a state where the decrease rate ΔV is relatively lower.

As schematically shown in FIG. 7A, when the motorcycle 1 is travelling on a good road surface which is high in a friction coefficient between the tire and the road surface, a gripping force of the wheel is above a lower limit (indicated by an arrow G along the braking characteristic line B) before the brake pressure P becomes extremely higher. If a high brake pressure P1 which causes the gripping force to become below the lower limit is applied to the wheel, the decrease rate ΔVf increases rapidly in a state where the brake pressure P1 remains unchanged, as indicated by an arrow L1 directed downward in FIG. 7A. Under this condition, the wheel speed will become approximately zero and the wheel will be locked. However, the ABS control is initiated at a point A1 in FIG. 7A to decrease the brake pressure P1, and as a result, the wheel is prevented from being locked.

As schematically shown in FIG. 7B, when the motorcycle 1 is traveling on a bad road surface, i.e., a surface of the low-pt-road, the wheel is more likely to be locked under a lower brake pressure P2 than on the good road surface, and the decrease rate ΔVf increases rapidly as indicated by an arrow L2. In this case, upon the decrease rate ΔVf reaching a threshold A2 smaller than the threshold A1 corresponding to the good road surface, the ABS control is initiated. Therefore, when the motorcycle 1 is traveling on the low-pt-road, the ABS control can be initiated earlier.

The first determiner section 54 determines the timing at which the ABS control should be initiated, based on the decrease rate ΔV of the wheel speed. In addition, the first determiner section 54 changes the threshold used to determine whether or not to initiate the ABS control based on the braking characteristic of the motorcycle 1 and the wheel researched in an experiment or the like, and the brake pressure P during the braking. This makes it possible to initiate the ABS control at a proper timing adapted to the braking characteristic of the motorcycle 1 while addressing a change in the road surface condition or a change in an attitude of a vehicle body of the motorcycle 1.

In addition to the above determination performed by the first determiner section 54, in the present embodiment, the second determiner section 55 determines that the ABS control should be initiated when a speed difference |Vf−Vr| between the front wheel speed Vf and the rear wheel speed Vr is greater. It is presumed that the front wheel 2 or the rear wheel 3 which is lower in wheel speed is more likely to be locked, during braking. Assuming that the higher wheel speed is the vehicle speed, the difference between the vehicle speed and the wheel speed of the wheel which is lower in wheel speed may correspond to a slip ratio of the wheel which is lower in wheel speed.

To be specific, the second determiner section 55 determines whether or not to initiate the ABS control based on the slip ratio of the wheel as in a conventional method. A threshold used in this determination is set to correspond to the driving state of the motorcycle 1 or the like so that a deviation from a slip ratio (target wheel slip ratio of a wheel slip ratio in the ABS control) in which a gripping force of a general rubber tire is greatest becomes a predetermined value.

—Control Procedure—

Hereinafter, a procedure of the ABS control for the rear wheel 3 will be described with reference to the flowchart of FIG. 8. After the start, in step S1, a value of an ABS flag F indicating whether or not the ABS control is activated is read. If F=1, i.e., the ABS control is activated (S1: NO), the process goes to step S11. On the other hand, If F=0, i.e., the ABS control is not activated (S1: YES), it is determined whether or not the brake pedal 16 has been depressed based on the signal from the rear wheel brake sensor 52 (brake is being actuated?), in step S2. If NO in step S2, the ABS flag F is reset in step S3 (F←0), and the process returns to step S1.

On the other hand, if YES in step S2, it is determined whether or not the clutch 27 of the transmission 18 is disengaged (clutch is disengaged?), in step 4. If YES in step S4, the process goes to steps S6~S9. On the other hand, if NO (clutch is engaged to transmit an engine driving power to the rear wheel 3), in step S4, it is determined whether or not a current time is within a predetermined time period during which engine braking affects the wheel speed more (engine braking affects more?), in step S5.

For example, when the driver has operated the throttle grip 7 quickly (displacement amount of the throttle grip 7 per unit time is not less than a set value) to decelerate the motorcycle 1, it is determined whether or not a preset time has passed after the quick operation of the throttle grip 7. If YES in step S5, the process returns to step S1. On the other hand, if NO in step S5, the process goes to step S6~S9, and it is determined whether or not to initiate the ABS control. Note that information relating to the displacement amount of the throttle grip 7 and the operated state (engaged/disengaged state) of the clutch 27 can be obtained via the engine ECU 40.

In other words, in a state where the driving power from the engine E is transmitted to the rear wheel 3, the determination as to the initiation of the ABS control is not performed for a time period after the throttle grip 7 has been moved quickly to a closed position. During this time period, the engine braking affects the wheel speed more. Therefore, the determination as to the initiation of the ABS control is not performed during this time period to prevent it from being initiated incorrectly. If the clutch 27 is disengaged, the engine braking does not affect the wheel speed. In this case, the determination as to the initiation of the ABS control is performed promptly, and thus, the ABS control can be initiated without delay.

If YES in step S4 or if NO in step S5, the process goes to step S6. In step S6, the wheel speed Vr is calculated based on the signal from the wheel speed sensor 35 of the rear wheel 3. In addition, based on the wheel speed Vr, the decrease rate ΔVr of the wheel speed of the rear wheel 3 is calculated, and a wheel speed deviation ΔVrf (=Vf−Vr) of the rear wheel 3 from the wheel speed Vf of the front wheel 2 is calculated.

Then in step S7, a threshold ΔVr* used to determine whether or not to initiate the ABS control by the first determiner section 54 is read and a threshold ΔVrf* used to determine whether or not to initiate the ABS control by the second determiner section 55 is read. As the threshold ΔVr* corresponding to the first determiner section 54, the decrease rate ΔVr* of the wheel speed corresponding to the rear wheel brake pressure P is read with reference to the threshold line T in the braking characteristic table of FIG. 5. The threshold ΔVrf* corresponding to the second determiner section 55 is read from a table (not shown) defining the threshold ΔVrf in correspondence with the brake pressure P.

In step S8, it is determined whether or not the decrease rate ΔVr of the rear wheel 3 is not less than the threshold ΔVr*. If YES in step S8, the process goes to step S10. If NO in step S8, the wheel speed deviation ΔVrf (deviation of the wheel speed Vr of the rear wheel 3 from the wheel speed Vf of the front wheel 2), is not less than the threshold ΔVrf*. Since the threshold ΔVrf* is a positive value, it is determined as NO irrespective of a magnitude (absolute value) of the wheel speed deviation ΔVrf, even when the rear wheel speed Vr is higher than the front wheel speed Vf, and the wheel speed deviation ΔVrf is a negative value.

If NO in step S9, it is not necessary to initiate the ABS control, and therefore, the process returns to step S1. On the other hand, if YES in step S9, the process goes to step S10. In step S10, the value of the ABS flag F is set to 1 (F←1). In step S11, the ABS control is initiated. A specific procedure of the ABS control is known, and therefore, will not be described in detail. The outline is as follows. The opening degree of the rear wheel first control valve 61 and the opening degree of the rear wheel second control valve 62 are duty-controlled so that the caliper pressure of the rear wheel brake 38 is decreased or maintained if the rear wheel 3 is going to be locked. If a braking force becomes too weak as a result of the above, the caliper pressure of the rear wheel brake 38 is increased or maintained so that the slip ratio of the rear wheel 3 is maintained at a target slip ratio and a maximum braking force is generated.

Although not described in detail, the ABS control terminates when a preset termination condition of the ABS control is met, for example, when the driver of the motorcycle 1 stops depressing the brake pedal 16. At this time, the value of the ABS flag F is reset (F←0). The ABS control is performed for the front wheel 2 as in the case of the rear wheel 3, which will not be described in detail. In this case, the decrease rate ΔVf is calculated from the wheel speed Vf of the front wheel 2, and the wheel speed deviation ΔVfr (=Vr−Vf) (deviation of the wheel speed Vf of the front wheel 2 from the wheel speed Vr of the rear wheel 3) is calculated.

In accordance with Embodiment 1 as described above, when the driver operates the brake lever 8 to actuate the front wheel brake 36 of the front wheel 2 and depresses the brake pedal 16 to actuate the rear wheel brake 38 of the rear wheel 3, during driving of the motorcycle 1, and thereby the wheel speed Vf of the front wheel 2 and the wheel speed Vr of the rear wheel 3 decrease, the first determiner section 54 in the brake ECU 50 appropriately determines the timing at which the ABS control should be initiated, based on the decrease rate ΔVf of the wheel speed Vf and the decrease rate ΔVr of the wheel speed Vr. In this determination, the vehicle speed of the motorcycle 1 is not estimated, and therefore, an error in estimation accuracy will not arise.

Since it is determined whether or not to initiate the ABS control based on the change in the wheel speed Vf (or Vr) which directly indicates that the wheel is more likely to be locked. This makes it possible to determine whether or not to initiate the ABS control more appropriately than in a case where the determination is performed based on indirect parameters such as a brake pressure. This is because determination as to the ABS control based on the brake pressure is affected a great deal by, for example, contamination of the brake discs 36A, 38A and engine braking.

Figure 9:
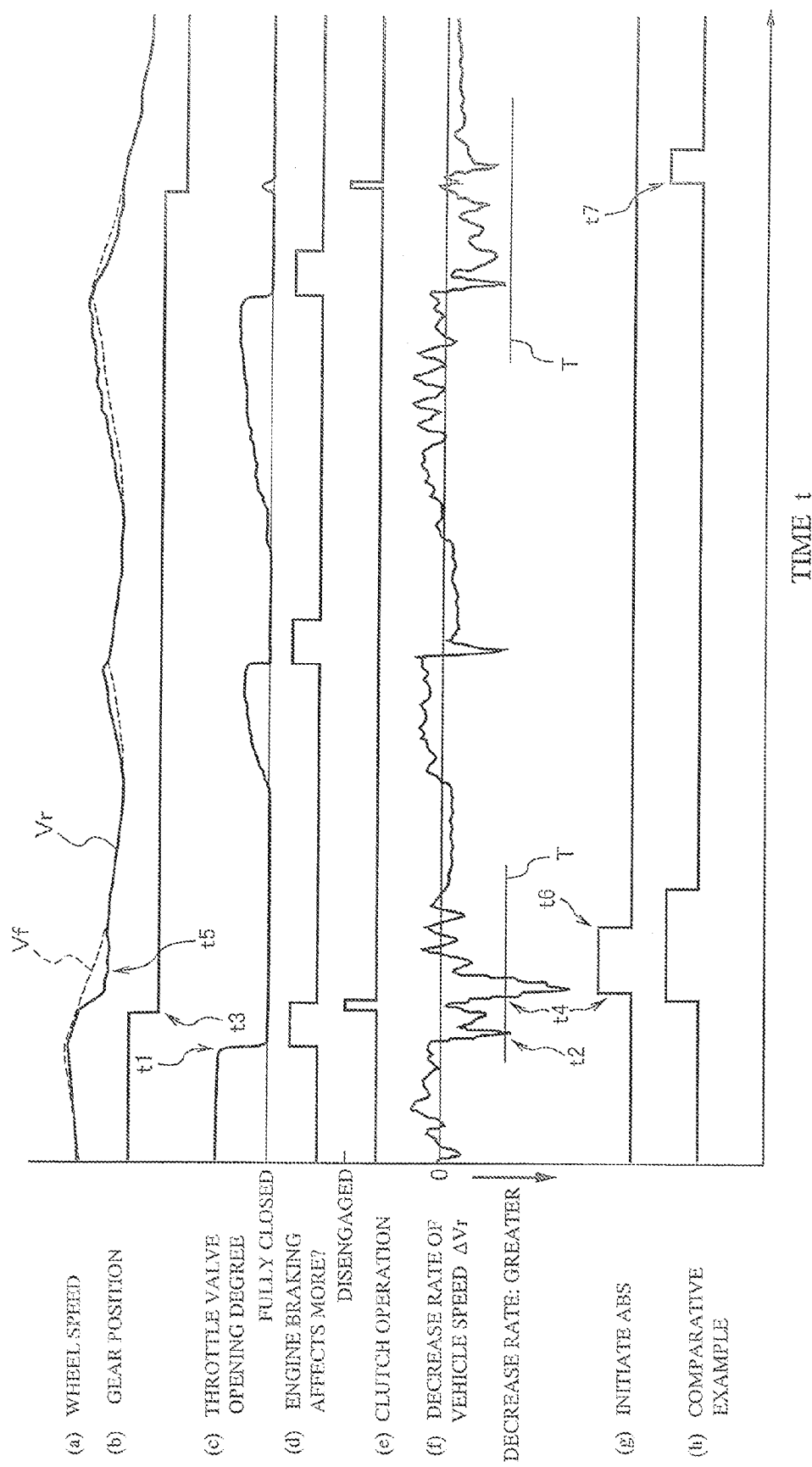
FIG. 9 is a time chart showing a change in a decrease rate of a vehicle speed of the rear wheel and initiation of the ABS control, in correspondence with vehicle speeds of front and rear wheels, a gear position, a throttle valve opening degree, and engaged/disengaged state of a clutch, during braking.

FIG. 9 is a time chart showing the change in the front wheel speed Vf and the change in the rear wheel speed Vr during braking as corresponding to the gear position, the throttle valve opening degree, the clutch engaged/disengaged state, etc., and determination as to the initiation of the ABS control based on the decrease rate ΔVr of the rear wheel speed Vr. This time chart is derived by conducting a braking test using the motorcycle 1 of the present embodiment. This time chart also shows a comparative example which is the conventional ABS control, in which it is determined whether or not to initiate the ABS control when the slip ratio of the wheel or the brake pressure becomes a value which is not less than a predetermined value.

Referring to FIG. 9, at time t1, the throttle grip 7 is moved quickly to a closed position (c), and the motorcycle 1 enters a braking state. In this braking state, the rear wheel speed Vr decreases due to the operation of the rear wheel brake 38 (not shown) and engine braking (a), and the decrease rate ΔVr of the rear wheel speed Vr increases rapidly (f). At this time, engine braking affects the wheel speed more for a time period after the throttle grip 7 has been moved quickly to a closed position (d). Therefore, the first determiner section 54 does not perform determination as to initiation of the ABS control. At time t2, the decrease rate ΔVr of the rear wheel speed Vr exceeds a threshold ΔVr* for a moment (below the threshold line T in FIG. 9), but the ABS control is not initiated.

In this case, the rear wheel speed Vr decreases for a moment due to engine braking. The rear wheel 3 will not be locked even if the ABS control is not performed. Thereafter, at time t3, the driver downshifts a gear position (b). Thereby, the wheel speed Vr of the rear wheel 3 becomes much lower than the wheel speed Vf of the front wheel 2 (a). At time t4, the decrease rate ΔVr of the rear wheel speed Vr exceeds the threshold ΔVr* again (f). In this case, a predetermine time has passed after the throttle grip 7 has been moved quickly to a closed position. Therefore, the first determiner section 54 determines whether or not to initiate the ABS control, and the ABS control is initiated (g).

At time t4, the ABS control is initiated to decrease the brake pressure applied to the rear wheel 3. As a result, the decrease rate ΔVr of the rear wheel speed Vr rapidly decreases (f). At time t5, decreasing of the wheel speed Vr almost stops, and a tendency that the rear wheel 3 will be locked is lessened (a). Then, the front wheel speed Vf decreases and approaches the rear wheel speed Vr, and the slip ratio of the rear wheel 3 decreases. Thus, at time t6, the ABS control terminates.

In a comparative example (h), how the ABS control is initiated in braking in the conventional method is shown. In the conventional method, the ABS control is initiated at the same timings as those of the ABS control of the present embodiment. However, in the conventional method, the ABS control is initiated at times when there is almost no difference between the front wheel speed Vf and the rear wheel speed Vr ((see (a), (g), and (h) in FIG. 9). It is estimated that the determination as to the initiation of the ABS control is performed primarily based on whether or not the brake pressure is greater than a predetermined value. Or, it is estimated that the determination as to the initiation of the ABS control is performed, when downshifting of a gear position is performed.

In accordance with the conventional ABS control, at time t7, the ABS is initiated unnecessarily. At time t7, the wheel speed Vr of the rear wheel 3 is substantially equal to the wheel speed Vf of the front wheel 2, and a slip ratio of the rear wheel 3 is not so high (a). After that, a difference between the wheel speed Vr and the wheel speed Vf does not increase so much, and therefore it may be determined that the ABS control is unnecessary. At this time, the brake pressure of the rear wheel 3 is relatively higher. In this situation, in the conventional ABS control, determination as to the initiation of the ABS control is performed incorrectly, when downshifting as a trigger occurs.

At time t7, the decrease rate ΔVr of the wheel speed Vr of the rear wheel 3 does not reach the threshold ΔVr*, i.e., above the threshold line T (f). In this state, in the brake control system of the present embodiment, the first determiner section 54 does not determine whether or not to initiate the ABS control. That is, if determination is performed based on the slip ratio of the wheel or the brake pressure, the ABS control is initiated incorrectly and excessively in the conventional method. However, in accordance with the present embodiment, it is determined properly whether or not to initiate the ABS control based on the decrease rate ΔV of the wheel speed.

As described above, the determination as to the initiation of the ABS control is not performed for a time period after the throttle grip 7 has been moved quickly to a closed position. This time period may be set properly based on an experiment or the like. For example, if this time is set relatively shorter, the ABS control can be initiated earlier, while if this time is set relatively longer, the initiation of the ABS control can be retarded.

In the present embodiment, in addition to the determination performed by the first determiner section 54, the second determiner section 55 determines whether or not to initiate the ABS control based on the slip ratio of the wheel as in the conventional method. Since the first and second determiner sections 54 and 55 perform the determination, the ABS control can be initiated earlier and more surely. If thresholds are set to make up for each other in view of a situation in which each of the first and second determiner sections 54 and 55 performs incorrect determination, the ABS control can be initiated without a delay as necessary while preventing the ABS control from being initiated excessively.

Embodiment 2

Hereinafter, Embodiment 2 of the present invention will be described. In Embodiment 2, the threshold ΔVf*, ΔVr* used to determine whether or not to initiate the ABS control in the first determiner section 54 is changed, based on the driving state of the motorcycle 1. The other constituents are identical to those of Embodiment 1. Therefore, they are identified by the same reference symbols and will not be described.

In the present embodiment, the driving state detector section 53 in the brake ECU 50 changes the threshold ΔVf*, ΔVr* based on a magnitude of the brake pressure P or change in the brake pressure P. For example, based on the change in the brake pressure P, the driving state detector section 53 detects that the driver has performed a quick brake operation. According to this, the driving state detector section 53 changes the threshold ΔVf*, ΔVr* to enable the ABS control to be initiated more easily.

Figure 8:
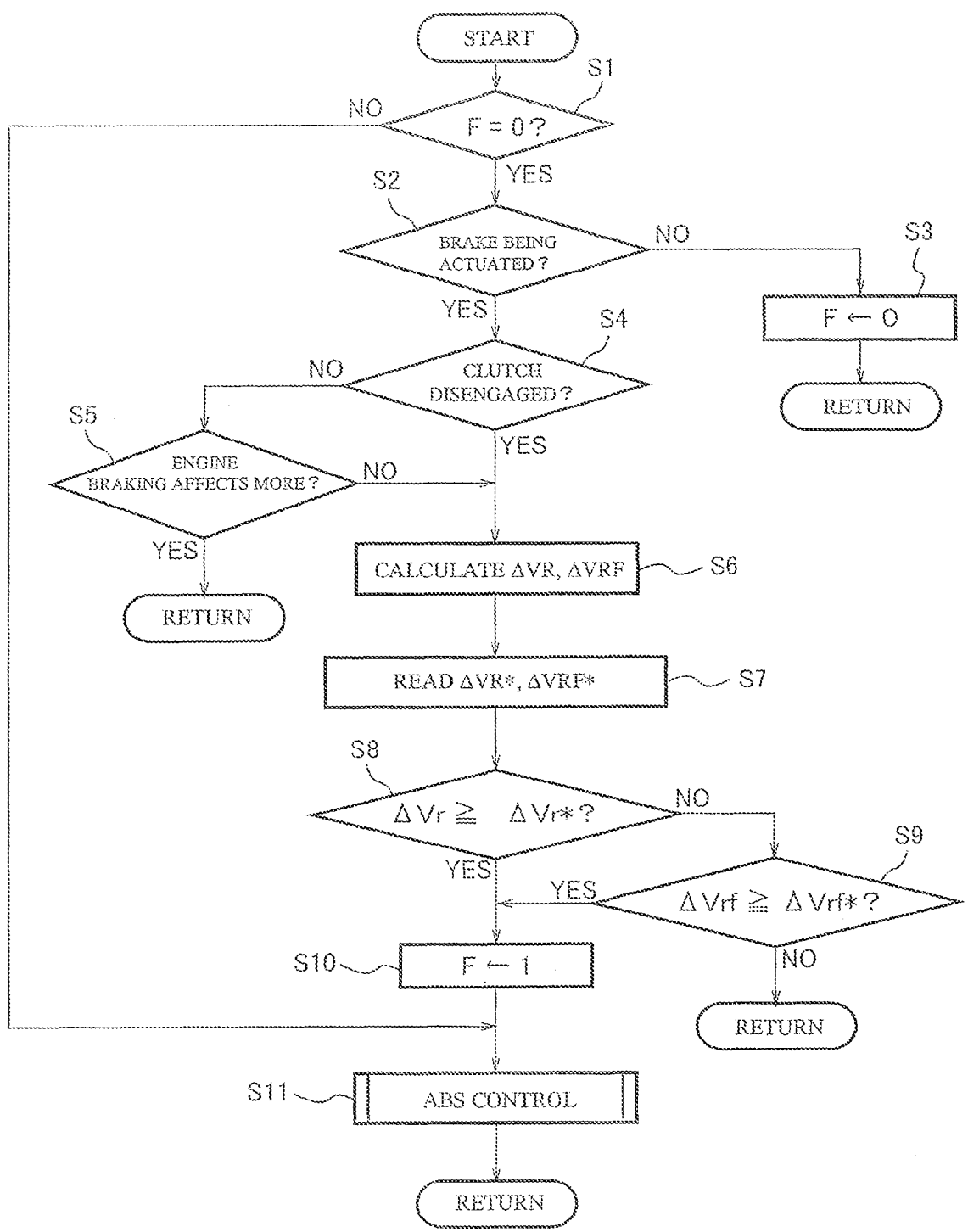
FIG. 8 is a flowchart showing a specific procedure of the ABS control.

To this end, a new step is provided between step S7 and step S8 in the flowchart of FIG. 8 so that the threshold ΔVr* is changed such that the threshold ΔVr* is made smaller as an increase rate of a change rate of the brake pressure P is greater. This allows the ABS control to be initiated earlier, for example, when a quick brake operation occurs, which causes the wheel 2, 3 to be locked easily. The threshold ΔVr* may be changed with reference to a preset table. Alternatively, for example, the threshold ΔVr* may be changed by calculation.

For example, the threshold ΔVr* may be made greater as a value corresponding to a braking force is greater. As the value corresponding to the braking force, a brake pressure Pr of the rear wheel 3 may be used. In this case, the threshold ΔVr* can be calculated according to a formula expressed as:

$$\Delta Vr^* \propto Pr, \Delta Vr^* = f1(Pr), \text{ or } \Delta Vr^* = k1 \times Pr$$

where f1(Pr) is a function containing Pr as a variable, and k1 is a coefficient.

Or, the threshold $\Delta Vr^*$ may be calculated according to a formula as follows:

$$\Delta Vr^* = k2 \cdot (f2(Pr) - \Delta Vr) + k4, \text{ or}$$

$$\Delta Vr^* = k2 \cdot (k3 \cdot Pr = \Delta Vr) + k4$$

where f2(Pr) is a function containing Pr as a variable, and k2~k4 are coefficients.

Or, the threshold $\Delta Vr^*$ may be changed such that the threshold $\Delta Vr^*$ is greater as the change in the value corresponding to the braking force is greater. The threshold $\Delta Vr^*$ may be calculated according to a formula expressed as:

$$\Delta Vr^* = f3(\Delta Pr), \text{ or}$$

$$\Delta Vr^* = k5 \times \Delta Pr$$

where f3($\Delta$Pr) is a function containing $\Delta$Pr as a variable, and k5 is a coefficient.

Or, the above formulas may be combined as follows, for example:

$$\Delta Vr^* = f3(\Delta Pr) + k2 \cdot (f2(Pr) - \Delta Vr) + k4$$

The above illustrated formulas are merely exemplary. Other terms may be added, or one of the terms may be contained in the formula. Although the ABS control for the rear wheel 3 has been described above, the threshold $\Delta Vf^*$ of the ABS control may be calculated for the front wheel 2.

Embodiment 3

Hereinafter, Embodiment 3 of the present invention will be described. In Embodiment 3, the threshold $\Delta Vf^*$, $\Delta Vr^*$ used to determine whether or not to initiate the ABS control is changed based on the wheel speed decrease rate $\Delta Vf$, $\Delta Vr$ calculated in the first determiner section 54 during braking. The other constituents are identical to those of Embodiment 1. Therefore, they are identified by the same reference symbols and will not be described.

Figure 10A:
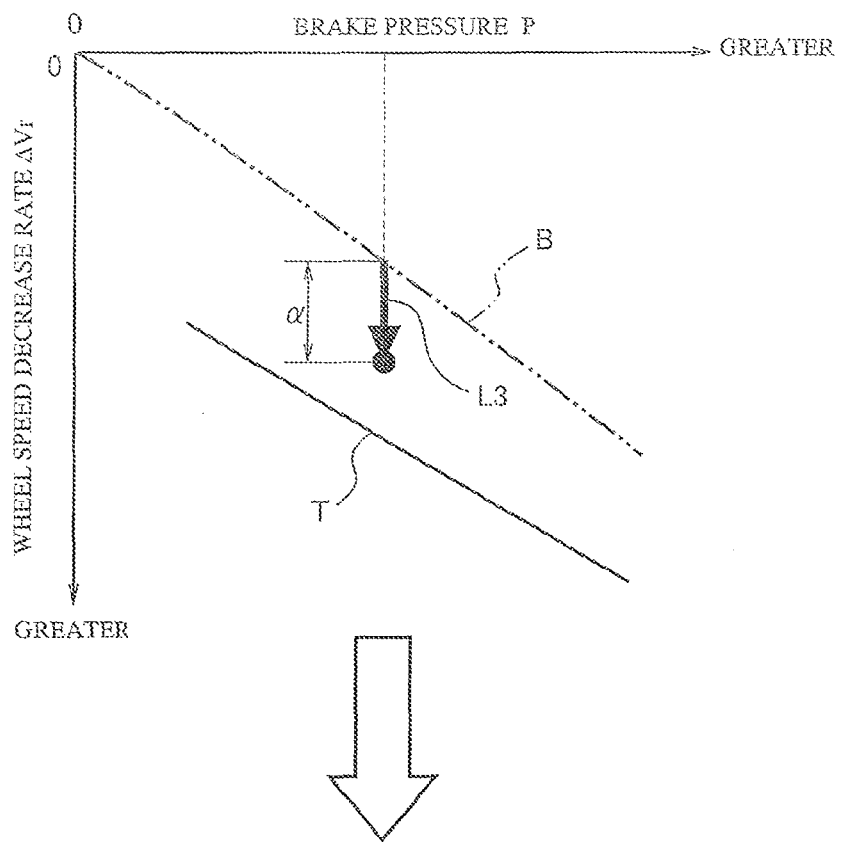
FIGS. 10A and 10B are views corresponding to FIGS. 7A and 7B, according to Embodiment 3.

In the present embodiment, as indicated by a downward arrow L3 of FIG. 10A, when the decrease rate $\Delta Vr$ of the rear wheel speed Vr increases and exceeds a standard decrease rate on the braking characteristic line B, i.e., becomes below the braking characteristic line B, as a result of the brake operation, the threshold $\Delta Vf^*$ may be changed such that the threshold $\Delta Vf^*$ is smaller as a value of a difference $\alpha$ between the standard decrease rate corresponding to the brake pressure P at that point of time and the decrease rate $\Delta Vr$ (actual decrease rate) is greater. In this case, the threshold $\Delta Vf^*$ may be changed with reference to a preset table or according to a formula.

Figure 10B:
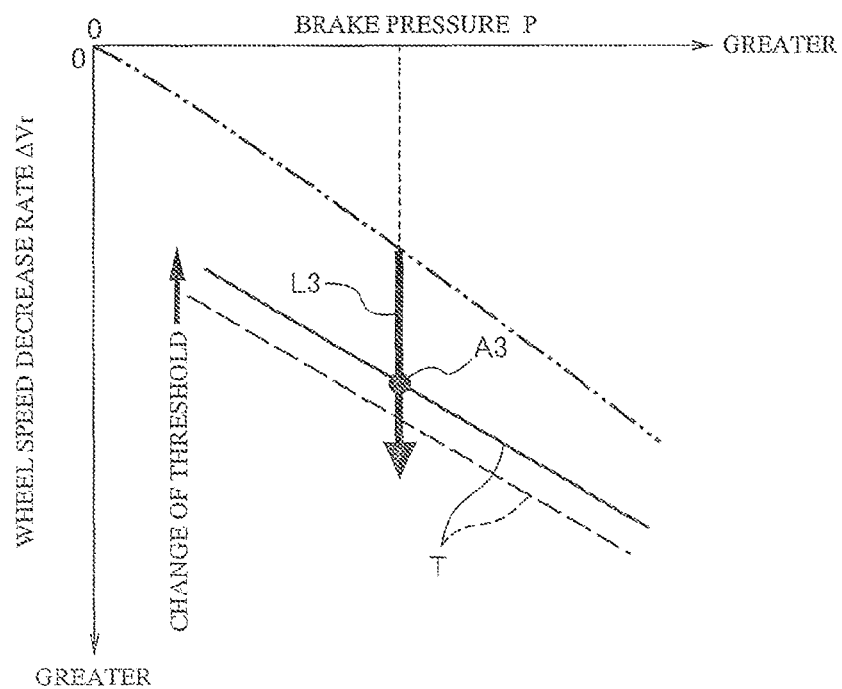

As a result of the above, as shown in FIG. 10B, the threshold line T shifts to an upper side, which allows the determination as to the initiation of the ABS control to be performed earlier (indicated by a point A3). To be specific, as the value of the decrease rate $\Delta Vr$ of the rear wheel speed Vr which is calculated by the first determiner section 54 is farther from the standard decrease rate, i.e., there is a higher tendency that the rear wheel 3 will be locked thereafter, the value of the threshold $\Delta Vr^*$ is made smaller. This allows the determination as to the initiation of the ABS control to be performed earlier.

Embodiment 4

Hereinafter, Embodiment 4 of the present invention will be described. In Embodiment 4, the driving state detector section 53 in the brake ECU 50 changes the threshold $\Delta Vf^*$, $\Delta Vr^*$ used to determine whether or not to initiate the ABS control in the first determiner section 54, based on driving state amounts as described below. The other constituents are identical to those of Embodiment 1. Therefore, they are identified by the same reference symbols and will not be described.

To be specific, in the step inserted between step S7 and step S8 in the flow chart of FIG. 8 in Embodiment 2, the threshold is changed in addition to the change of the threshold according to the brake pressure P of the front wheel 2, the brake pressure P of the rear wheel 3, and the change rates $\Delta P$.

The threshold $\Delta Vf^*$ or the threshold $\Delta Vr^*$ of either one of the front and rear wheels 2 and 3 may be made smaller as a difference with a wheel speed of the other of the front and rear wheels 2 and 3 is greater. As described above, the wheel speed difference |Vf−Vr| corresponds to a slip ratio of the wheel which is lower in wheel speed. As the wheel speed difference is greater, i.e., the slip ratio is greater and the wheel is more likely to be locked, it can be determined earlier whether or not to initiate the ABS control.

The threshold $\Delta Vf^*$, $\Delta Vr^*$ may be made smaller as a change in the wheel speed difference |Vf−Vr| is greater. This makes it possible to further improve accuracy of determination as to the initiation of the ABS control based on a slip state of the wheel 2, 3 of the motorcycle 1.

Moreover, the threshold $\Delta Vf^*$, $\Delta Vr^*$ may be changed in view of the features of the front and rear wheels 2 and 3.

During braking of the motorcycle 1, the rear wheel 3 tends to become spaced apart from the road surface, and the wheel speed Vr may deviate from the vehicle speed. Therefore, the threshold $\Delta Vf^*$ corresponding to the front wheel 2 may be made smaller as the decrease rate $\Delta Vr$ of the wheel speed Vr of the rear wheel 3 is greater.

The rear wheel 3 which is a drive wheel will not be locked in many cases if the rear wheel 3 is coupled to the engine E or the transmission 18. Therefore, the threshold $\Delta Vr^*$ may be changed according to an operated state (engaged/disengaged state) of the clutch 27. To be specific, when the clutch 27 is disengaged, the threshold $\Delta Vr^*$ corresponding to the rear wheel 3 may be made smaller, thereby allowing the ABS control to be initiated earlier.

To be more specific, the threshold $\Delta Vf^*$ corresponding to the front wheel 2 may be calculated according to the following formula:

$$\Delta Vf^* = f1(\Delta Pf) + k2 \cdot (f2(Pf) - \Delta Vf) + k4 + k5 \times \text{Slip} + k6 \times Rr\_DEC + k7 \times \Delta \text{Slip}$$

where Slip is the slip ratio of the front wheel 2, and may be, for example, |Vr−Vf|/Vf, Rr_DEC is the decrease rate $\Delta Vr$ of the rear wheel speed Vr, and is a term for reflecting the fact that the rear wheel 3 is spaced apart from the road surface, and k6 and k7 are coefficients.

Likewise, the threshold $\Delta Vr^*$ corresponding to the rear wheel 3 may be calculated according to the following formula:

$$\Delta Vr^* = f1(\Delta Pr) + k2 \cdot (f2(Pr) - \Delta Vr) + k4 + k5 \times \text{Slip} + k6 \times \Delta(Vr/Ne) + k7 \times \Delta \text{Slip},$$

wherein $\Delta(Vr/Ne)$ is a change in a ratio of the rear wheel speed Vr to an engine speed Ne, and is a term for reflecting the operated state of the clutch 27.

The above illustrated formulas are merely exemplary. Other terms may be added or one of the terms may be contained in the formula. By using these formulas, the threshold $\Delta Vf^*$, $\Delta Vr^*$ changes according to the driving state of the motorcycle 1, which improves accuracy of determination as to the initiation of the ABS control.

In accordance with Embodiment 4, the timing at which the ABS control is initiated is changed precisely by reflecting the driving state of the motorcycle 1 more precisely. In this way, the ABS control can be initiated at an optimal timing. As a result, driving stability of the motorcycle 1 can be improved while enhancing braking performance of the motorcycle 1, and the driver can enjoy a natural driving feel.

Other Embodiment

The above embodiments are merely exemplary, and are in no way intended to limit the present invention. The embodiments can be improved, changed or modified within a scope of the invention. Although in the above embodiments, the ABS control is initiated when either the first determiner section 54 or the second determiner section 55 in the brake ECU 50 determines whether or not to initiate the ABS control. Alternatively, the ABS control may be initiated when both of the first determiner section 54 and the second determiner section 55 determine whether or not to initiate the ABS control. This can suppress the ABS control from being initiated excessively.

The brake ECU 50 may include at least the first determiner section 54. That is, the second determiner section 55 may be omitted. Instead of the determination based on the value associated with the wheel speed difference |Vf−Vr| between the front wheel 2 and the rear wheel 3 like the above embodiments, the determination may be made based on the brake pressure P or the like. That is, the condition used to determine whether or not to initiate the ABS control is required to include the first condition based on the decrease rate ΔV of the wheel speed associated with the first determiner section 51.

As the brake pressure P or the like, a signal from the brake pressure sensor 51 of the front wheel 2 and a signal from the brake pressure sensor 52 of the rear wheel 3 may be used. The brake pressure may be the caliper pressure or the master pressure. Or, other than the brake pressure, a displacement amount of the brake lever 8 operated by the driver, a displacement amount of the brake pedal 16 which is depressed by the driver, or a displacement amount of a brake pad may be used. In brief, the brake pressure or the like is required to include brake amount command information of the driver's brake operation.

The braking force applied to the wheel may be, for example, an engine braking force. The engine braking force is estimated based on a current speed or a current engine state, and may be set as the braking force. Although in the above embodiments, the brake pressure is adjusted to prevent the front wheel 2 (or rear wheel 3) from being locked, another method may be used to prevent the lock. For example, to prevent the rear wheel 3 which is the drive wheel from being locked, a magnitude of the engine braking force may be adjusted if possible. In the case of an electric vehicle, a regenerative braking amount of a motor may be adjusted.

Although in the above embodiments, the first determiner section 54 in the brake ECU 50 changes the threshold ΔVf*, ΔVr* according to the brake pressure P with reference to the braking characteristic table, the threshold ΔVf*, ΔVr* may be set constant without depending on the brake pressure P. In this setting, the ABS control can be initiated even if the sensor 51, 52 for detecting the brake pressure P fails. In addition, the present invention is applicable to brakes other than the hydraulic brake. In the above embodiments, the threshold ΔVf*, ΔVr* may be set constant when the brake pressure sensor 51, 52 fails.

Although in the above embodiments, the clutch switch 28 is provided to detect the operated state of the clutch 27 of the transmission 18, the operated state of the clutch 27 may be detected based on a signal from a hydraulic sensor when the clutch 27 is a hydraulic clutch. Or, the operated state of the clutch 27 may be detected based on a change in the engine speed. In other words, it can be detected that the clutch 27 is actuated based on the fact that a ratio between a drive wheel speed and a driving power rotational speed changes significantly from an assumed gear ratio.

In the above embodiments, the determination as to the initiation of the ABS control is not performed before the predetermined time period passes after the throttle grip 7 is operated quickly to decelerate the motorcycle 1. This time period may be changed according to the driving state of the motorcycle 1, or may be ended based on specified information such as the engine speed or the driving speed. Or, the predetermined time period may be set to zero.

Although the present invention is applied to a case where the ABS control is executed for both of the front and rear wheels 2 and 3, it may be applied to a case where the ABS control is executed only for either the front wheel 2 or the rear wheel 3.

Although not shown, in the above embodiments, the motorcycle 1 may be provided with a switch (setting operation device) operated by the driver to set an initiation condition of the ABS control, and the threshold used to determine whether or not to initiate the ABS control may be changed in response to the operation of the switch.

Figure 11:
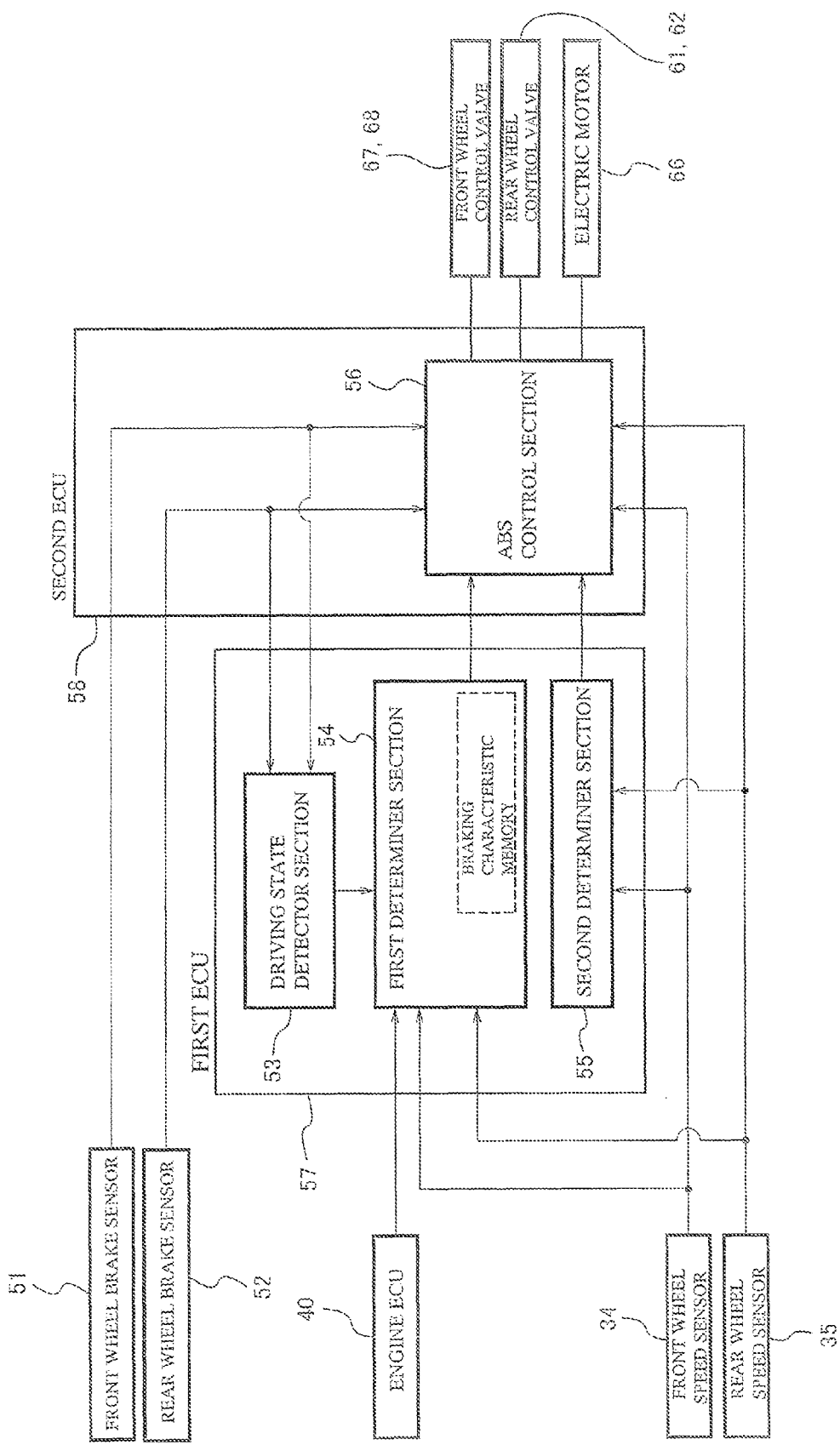
FIG. 11 is a view corresponding to FIG. 4 according to another embodiment, showing a configuration in which first and second determiner sections and an ABS control section are included in separate ECUs, respectively.

Although in the embodiments, the single brake ECU 50 includes the driving state detector section 53, the first determiner section 54, the second determiner section 55, and the ABS control section 56, the driving state detector section 53, the first determiner section 54, the second determiner section 55, and the ABS control section 56 may be included in separate ECUs, respectively. As shown in FIG. 11, a first ECU 57 including the driving state detector section 53, the first and second determiner sections 54 and 55 and a second ECU 58 including the ABS control section 56 may be provided such that the first ECU 57 and the second ECU 58 cooperate.

In this configuration, while optimizing the control for determining whether or not to initiate the ABS control for each vehicle type, the ABS control can be performed in the same way after the initiation. This will not increase development cost. The second ECU 58 including the ABS control section 56 can be implemented by utilizing a general system.

Although not shown, the second determiner section 55 may be included in the first ECU 57. In this case, the first ECU 57 may be an engine control ECU configured to execute ignition control or fuel injection control of the engine E. For example, the second ECU 58 may be configured to communicate to the first ECU 57 information indicating a state of the ABS control being executed, and information indicating that the condition (slip ratio) used to determine whether or not to initiate the ABS control is met. In addition, the second ECU 58 may initiate or terminate the ABS control in response to a command for executing or terminating the ABS control, which is received from the first ECU 57. Or, the first ECU 57 may determine whether or not the condition used to initiate the ABS control is met, and communicate information indicating a result of the determination to the second ECU 58. Or, the second ECU 58 may execute the operation (braking, and termination of braking) in the middle of the ABS control.

Although not shown, in a case where the motorcycle 1 includes a suspension control device which can control at least one of a spring force and a damping force of front and rear suspensions, or the engine ECU 40 includes a traction control section for controlling an engine driving power to prevent the rear wheel 3 from spinning, at least one of the suspension control device and the traction control section may be fed with information indicating whether or not to initiate the ABS control. For example, in the ABS control, the attitude of the vehicle may be changed by suspension control to increase a ground load of the wheel which will be more likely to be locked.

The first ECU 57 may receive information given by the driver, such as a traction control mode, passenger information, driving information, or ABS operating state, via an interface, and may adjust the condition used to initiate the ABS control based on the received information. The traction control mode is an execution mode of the traction control. For example, in a case where the value of the traction control mode is greater, the threshold of the ABS control may be set smaller. In a case where the value of the passenger information (weight) is smaller, the threshold of the ABS control may be set smaller. In a case where a higher priority is given to a driving power instead of fuel efficiency, the threshold of the ABS control may be set smaller. In a driving mode (high-μ-road mode) in which the motorcycle 1 is driving on a circuit, the threshold of the ABS control may be set greater than in a driving mode in which the motorcycle is traveling in a town. Likewise, the first ECU 57 may receive information indicating driving states such as an engine speed, a gear ratio, or a throttle valve opening degree and adjust the condition used to initiate the ABS control based on the received information.

For example, the first ECU 57 may estimate a magnitude of a friction coefficient between the road surface and the tire during driving of the motorcycle 1. The first ECU 57 may adjust the condition used to initiate the ABS control based on a result of estimation. It can be estimated that the friction coefficient between the road surface and the tire is lower as a change in the slip ratio of the rear wheel 3 during driving of the motorcycle 1 is greater. The slip ratio of the rear wheel 3 may be, for example, $$|Vf-Vr|/Vr.$$

Although not shown, an ECU having a function of the first ECU 57 may be provided separately from the engine ECU 40. In this case, the engine ECU 40, the ABS ECU, and the ECU of the suspension control device may be fed with commands and may be controlled collectively.

For example, if the following formula is satisfied during a decelerated driving state (v1>v2), when a vehicle speed at a first time point is a first vehicle speed v1, and a vehicle speed at a second time point which is a predetermined time after the first time point is v2, the ABS control may be initiated:

$$(v1-v2) \geq \Delta v^*$$

where Δv* is a predetermined threshold, and is a constant value irrespective of a magnitude of the braking force. As in the above embodiments, there may be provided a time period during which determination as to initiation of the ABS control is not performed, like a case where the throttle grip 7 is moved quickly to a closed position. When engine braking does not occur, determination as to the initiation of the ABS control may be performed.

Although in the above embodiments, the present invention is applied to the motorcycle 1, it may be applied to, for example, four-wheeled vehicles and straddle-type vehicles straddled by a driver. The present invention which is capable of determination as to the initiation of the ABS control without the use of a vehicle speed difference between the front and rear wheels is suitably applied to a vehicle in which its center of gravity is high and one of the front and rear wheels tends to be spaced apart from the road surface due to a pitching motion, a vehicle in which a driving power is sometimes excess relative to its weight and has a tendency that its front wheel is spaced apart from the road surface, or a vehicle (lightweight vehicle, straddle-type vehicle) which is lightweight and has a tendency that its wheel is spaced apart from the road surface. The straddle-type vehicle includes an ATV (all terrain vehicle) as well as the motorcycle. A driving power source of the vehicle is not limited to the engine E, but may be, for example, an electric motor.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A brake control system in a vehicle which executes anti-lock brake control for controlling a braking force applied to a wheel to prevent the wheel from being locked during braking of the vehicle, the system including one or more control units comprising:
   an initiation determiner section configured to:
      receive a signal from one or more wheel speed sensors;
      determine whether or not an initiation condition used to initiate the anti-lock brake control is met, the initiation condition including a condition in which a decrease rate of a wheel speed which is a rotational speed of the wheel is not less than a predetermined threshold; and
      generate output indicating whether the initiation condition is met;
   a brake control section configured to:
      receive the output from the initiation determiner section indicating whether the initiation condition is met; and
      initiate control of the braking force applied to the wheel in the anti-lock brake control, if the initiation determiner section determines that the initiation condition is met; and
   a driving state detector section configured to:
      receive a signal from one or more brake sensors;
      detect a brake amount command value of a driver's brake operation during braking; and
      generate output indicating the brake amount command value,
   wherein the initiation determiner section changes the threshold used to determine whether or not to initiate the anti-lock brake control, such that the threshold is smaller as the detected brake amount command value is smaller, and
   wherein the detected brake amount command value includes one or more of a hydraulic brake pressure, a displacement amount of a brake lever, a displacement amount of a brake pedal, or a displacement amount of a brake pad.

2. The brake control system in the vehicle according to claim 1,
   wherein the vehicle includes an accelerator operation member operated by a driver; and
   wherein the initiation determiner section does not determine whether or not the initiation condition is met, during a predetermined time period which passes after the accelerator operation member has been operated quickly to decelerate the vehicle.

3. The brake control system in the vehicle according to claim 2,
   wherein the vehicle includes a clutch between a drive wheel and a driving power source; and
   wherein the initiation determiner section determines whether or not the initiation condition is met within the predetermined time period which passes after the accelerator operation member has been operated quickly to decelerate the vehicle, if the clutch is disengaged.

4. The brake control system in the vehicle according to claim 1, comprising:
a braking characteristic memory for storing as a braking characteristic of the wheel, a relation between the brake amount command value and the decrease rate of the wheel speed in a range in which the vehicle is not locked such that the decrease rate increases with an increase in the brake amount command value;
wherein the initiation determiner section changes the threshold used to determine whether or not to initiate the anti-lock brake control based on the braking characteristic such that the threshold is smaller as the value of the brake amount command value detected by the driving state detector section is smaller.

5. The brake control system in the vehicle according to claim 4,
wherein the braking characteristic memory contains a standard value of a rate of a decrease in a wheel speed of the wheel which is caused by the brake amount command value; and
wherein the initiation determiner section identifies a standard value of the decrease rate of the wheel speed based on the value of the brake amount command value detected by the driving state detector section, with reference to the braking characteristic; and
wherein the initiation determiner section changes the threshold used to determine whether or not to initiate the anti-lock brake control such that the threshold is smaller as a difference between the standard value and the decrease rate is greater if the decrease rate is greater than the standard value.

6. The brake control system in the vehicle according to claim 1,
wherein the initiation determiner section changes the threshold used to determine whether or not to initiate the anti-lock brake control such that the threshold is smaller as a change rate of the brake amount command value detected by the driving state detector section is greater.

7. The brake control system in the vehicle according to claim 1,
wherein the initiation condition includes a first condition based on the decrease rate of the wheel speed and a second condition based on a parameter other than the decrease rate of the wheel speed; and
wherein the initiation determiner section determines that the initiation condition is met, if both of the first and second conditions are met.

8. The brake control system in the vehicle according to claim 1,
wherein the initiation condition includes a first condition based on the decrease rate of the wheel speed and a second condition based on a parameter other than the decrease rate of the wheel speed; and
wherein the initiation determiner section determines that the initiation condition is met, if one of the first and second conditions is met.

9. The brake control system in the vehicle according to claim 1,
wherein the initiation determiner section and the brake control section may be included in separate ECUs, respectively.

10. The brake control system in the vehicle according to claim 1,
wherein the vehicle includes a setting operation member operated by a driver to set the initiation condition of the anti-lock brake control; and
wherein the initiation determiner section changes the threshold used to determine whether or not to initiate the anti-lock brake control, according to the driver's operation of the setting operation member.

11. The brake control system in the vehicle according to claim 1,
wherein the threshold is set larger than a braking characteristic line indicating a relation between the brake amount command value of the braking force applied to the wheel, and the decrease rate of the wheel speed in a range in which the vehicle is not locked such that the decrease rate increases with an increase in the brake amount command value.

12. The brake control system in the vehicle according to claim 1,
wherein the initiation determiner section determines whether or not the initiation condition of the anti-lock brake control is met, based on the decrease rate of the wheel speed of a front wheel.

13. The brake control system in the vehicle according to claim 12,
wherein the initiation determiner section determines whether or not the initiation condition of the anti-lock brake control is met, based on the decrease rate of the wheel speed of the front wheel, and a caliper pressure of a front wheel brake.

14. The brake control system in the vehicle according to claim 1,
wherein the initiation determiner section determines whether or not the initiation condition of the anti-lock brake control is met, based on the decrease rate of the wheel speed of a rear wheel.

15. The brake control system in the vehicle according to claim 14,
wherein the initiation determiner section determines whether or not the initiation condition of the anti-lock brake control is met, based on the decrease rate of the wheel speed of the rear wheel, and a caliper pressure of a rear wheel brake.

16. A brake control system in a vehicle which executes anti-lock brake control for controlling a braking force applied to a wheel to prevent the wheel from being locked during braking of the vehicle, the system including one or more control units comprising: an initiation determiner section configured to:
receive a signal from one or more wheel speed sensors;
determine whether or not an initiation condition used to initiate the anti-lock brake control is met, the initiation condition including a condition in which a decrease rate of a wheel speed which is a rotational speed of the wheel is not less than a predetermined threshold; and
generate output indicating whether the initiation condition is met;
a brake control section configured to:
receive the output from the initiation determiner section indicating whether the initiation condition is met; and initiate control of the braking force applied to the wheel in the anti-lock brake control, if the initiation determiner section determines that the initiation condition is met; and a driving state detector section configured to:

receive a signal from one or more brake sensors;

detect a brake amount command value of a driver's brake operation during braking; and generate output indicating the brake amount command value, wherein the initiation determiner section changes the threshold used to determine whether or not to initiate the anti-lock brake control, such that the threshold is smaller as the detected brake amount command value is smaller, and wherein the detected brake amount command value includes a caliper pressure of a front wheel brake or a rear wheel brake.

* * * * *